US006303666B1

(12) United States Patent
Yorita et al.

(10) Patent No.: US 6,303,666 B1
(45) Date of Patent: Oct. 16, 2001

(54) PROCESS FOR THE PRODUCTION OF EXPANDED OLEFINIC THERMOPLASTIC ELASTOMER PRODUCTS

(75) Inventors: Kaoru Yorita; Eiichi Sugihara; Masahiro Takedachi; Haruo Inoue; Shigeo Nishikawa; Yoko Shimada; Michio Eriguchi, all of Kanagawa; Takanori Sueda, Chiba; Akira Uchiyama, Chiba; Yuichi Ito, Chiba, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/359,745

(22) Filed: Jul. 23, 1999

(30) Foreign Application Priority Data

Jul. 30, 1998 (JP) .................................... 10-216195
Feb. 5, 1999 (JP) .................................... 11-028072

(51) Int. Cl.[7] ........................................................ C08J 9/00
(52) U.S. Cl. ................................ 521/79; 521/81; 521/134
(58) Field of Search ................................. 521/79, 81, 134

(56) References Cited

U.S. PATENT DOCUMENTS

| 4,746,564 | * | 5/1988 | Shin | 521/79 |
| 4,761,328 | * | 8/1988 | Shin | 521/79 |
| 5,288,762 | * | 2/1994 | Park et al. | 521/79 |
| 5,340,840 | * | 8/1994 | Park | 521/143 |
| 5,369,136 | * | 11/1994 | Park | 521/79 |
| 5,844,009 | * | 12/1998 | Hurley et al. | 521/79 |
| 5,859,076 | * | 1/1999 | Kozma et al. | 521/79 |
| 5,883,144 | * | 3/1999 | Bambara et al. | 521/79 |
| 5,929,129 | * | 7/1999 | Feichtinger | 521/79 |
| 6,103,775 | * | 8/2000 | Bambara et al. | 521/79 |

* cited by examiner

Primary Examiner—Morton Foelak
(74) Attorney, Agent, or Firm—Burns, Doane, Swecker & Mathis. L.L.P.

(57) ABSTRACT

A process is provided for the production of expanded olefinic thermoplastic elastomer product having good external appearance, flexibility and heat resistance. This process features using, as raw materials, a particular olefinic thermoplastic elastomer and carbon dioxide as a blowing agent.

18 Claims, 7 Drawing Sheets

PROCESS FOR THE PRODUCTION OF EXPANDED OLEFINIC THERMOPLASTIC ELASTOMER PRODUCTS

BACKGROUND OF THE INVENTION

1) Field of the Invention

This invention relates to a process for the production of expanded thermoplastic elastomer products. More specifically, the present invention is concerned with a process for producing the expanded products by using a particular olefinic thermoplastic elastomer and as a blowing agent, carbon dioxide.

Expanded products available in accordance with the present invention are excellent in flexibility, heat resistance and surface appearance and are suitably usable, for example, as interior materials for cars, vehicles and ships or as interior materials for buildings such as houses.

2) Description of the Related Art

Conventional processes known for the production of expanded products of elastomers include a process in which an expanded product of an elastomer is obtained by kneading a vulcanizer and a blowing agent with natural rubber or a synthetic rubber, forming the thus-kneaded compound into a predetermined shape and then heating the thus-formed compound to effect vulcanization and expansion.

To form the aforementioned rubber into the predetermined shape by continuous extrusion, for example, the above-described process however requires, before the continuous extrusion, a step so that additives can be added and kneaded batchwise with rubber to obtain a kneaded melt beforehand. In addition, to facilitate the feeding of the kneaded melt to an extruder, it is also necessary to conduct, before the continuous extrusion, a further step so that the kneaded melt can be formed into a ribbon-like shape in advance. As is understood from the foregoing, processes such as that described above need complex production steps and moreover, require considerable time for the vulcanizing and expanding step, and are hence disadvantageous for industrial production.

As processes free of these problems, processes making use of soft olefin plastics, for example, ethylene-vinyl acetate copolymer and low-density polyethylene are already known. According to these processes making use of such soft olefin plastics, the above-mentioned steps can be omitted.

These processes, however, involve a problem in that a considerable limitation is imposed on the application of resulting expanded products because these soft olefin plastics are basically inferior in heat resistance to rubber.

On the other hand, it is known from Japanese Patent Laid-Open No. 26838/1973, Japanese Patent Laid-Open No. 112967/1979 and the like that as materials showing intermediate properties between soft olefin plastics and vulcanized rubber, for example, partially-crosslinked compositions composed of olefin copolymers and olefin plastics are usable as thermoplastic elastomers.

In these thermoplastic elastomers, however, the olefin plastic components are decomposed when dynamically heat-treated in the presence of a peroxide. When melted, these thermoplastic elastomers are therefore inferior in tension so that the expanding gas tends to escape without being retained inside. Expanded products, even if available, are accompanied by problems in that their expansion ratios are as low as 1.5 times or so and marked surface roughening is observed due to the escape of expanding gas.

With a view to resolving such problems, an expanded olefinic thermoplastic elastomer product, which has an expansion ratio of at least 2 times and is free of surface roughening caused by escape of expanding gas, and a process for producing the expanded product with good productivity through simplified steps are proposed in Japanese Patent Laid-Open No. 143297/1997.

This patent publication describes to the effect that an expanded product is obtained by heating an expandable composition composed of a thermoplastic elastomer, an olefin plastic and a blowing agent. A process making use of azodicarbonamide or sodium hydrogencarbonate as a blowing agent is disclosed. This process is described to be able to produce an expanded olefinic thermoplastic elastomer product which is not available from the invention disclosed in Japanese Patent Laid-Open No. 112967/1979.

However, the expansion ratios of expanded products available from the invention disclosed in Japanese Patent Publication No. 143297/1997 are below 2.9 times, thereby making it difficult to consider that a process capable of producing expanded olefinic thermoplastic elastomer products of various expansion ratios for use in a wide variety of application fields has been provided.

A chemical expanding process such as that employed in the production of the above-described expanded elastomer product generally comprises, as disclosed in the patent publication referred to in the above, mixing raw material with an organic blowing agent of a low molecular weight, which decomposes at a molding temperature to produce gas, and then heating the resulting mixture to a decomposing temperature of the blowing agent or higher to effect expansion molding. According to this process, the production of gas is proportional to the molding temperature, and the decomposition temperature can be easily adjusted by adding an expanding aid or the like. Moreover, this process can obtain expanded products having closed cells.

However, in addition to high production cost for the use of a special blowing agent, these expanded products tend to develop discoloration, offensive odor, food sanitation problems and the like due to decomposition residues of the blowing agent, said decomposition residues remaining in the expanded products. There are other problems including smearing of molding machines caused by a chemical blowing agent and defective molding associated with such smearing.

On the other hand, a gas expanding process is a physical expanding process and comprises melting a resin in a molding machine, feeding an organic compound of a low boiling point such as butane, pentane or dichlorodifluoromethane to the molten resin, kneading the molten resin and the organic compound together, and then releasing the resulting mixture into a low-pressure zone to effect expansion molding. The organic compound of the low melting point, which is employed in this process, has high compatibility with the resin and is hence excellent in solubility and also in foam retention, so that it features the availability of expanded products of high expansion ratios. Nonetheless, such blowing agents are costly and moreover, include potential hazardous problems such as inflammability and toxicity. The also have a potential problem of air pollution. Further, there is a move toward the total ban of Freon-series gases led by dichlorodifluoromethane in view of environmental problems such as destruction of the ozonosphere.

With a view to overcoming such problems of the conventional processes, numerous processes making use of an inert gas such as carbon dioxide gas or nitrogen as a blowing agent, said inert gas being clean and economical, have been proposed.

However, the inert gas has poor solubility in a resin because of its low compatibility with the resin. This makes it difficult to provide expanded products with high expansion ratio. For the production of an expanded product of high expansion ratio, it is necessary to raise the pressure of an inert gas upon its injection under pressure into a molten resin so that the gas can be dissolved at a high content in the resin. Accordingly, it has been difficult to produce expanded products with uniform quality.

Accordingly, there is not believed to be any choice other than coming to a conclusion that use of these conventional chemical expanding processes is accompanied with a significant limitation imposed on the range of expansion ratios of available expanded olefinic thermoplastic elastomer products and also that expanded elastomer products can hardly be produced with uniform quality even when any known production process of expanded products, which makes use of an inert gas, is applied.

SUMMARY OF THE INVENTION

An object of this invention is to provide an expanded olefinic thermoplastic elastomer product excellent in flexibility, heat resistance and surface appearance, and another object of this invention is to provide a process for producing the expanded product with uniform quality by using carbon dioxide as a blowing agent.

The present inventors have proceeded with extensive research on expanded olefinic thermoplastic elastomer products and production thereof. As a result, it has been found that for obtaining expanded products of various expansion ratios, a process for causing expansion by using carbon dioxide as a blowing agent and a process for causing expansion by using carbon dioxide in a supercritical state as a blowing agent are suited, leading to the present invention.

The present invention therefore provides a process for producing an expanded product with carbon dioxide as a blowing agent, which comprises:

as a gas-dissolving step, adding carbon dioxide to a molten olefinic thermoplastic elastomer selected from the below-described elastomers (A-1) to (A-3) in a proportion of 0.1 to 30 parts by weight of said carbon dioxide per 100 parts by weight of said molten olefinic thermoplastic elastomer (A), and forming a molten olefinic thermoplastic elastomer composition in which said olefinic thermoplastic elastomer and said carbon dioxide are in a mutually-dissolved state; and as a cooling step, lowering said molten olefinic thermoplastic elastomer composition in temperature.

(A-1) an ethylene-α-olefin copolymer composed of ethylene and an α-olefin having 3 to 20 carbon atoms;

(A-2) an ethylene-α-olefin-non-conjugated diene copolymer composed of ethylene, an α-olefin having 3 to 20 carbon atoms and a non-conjugated diene; and (A-3) a crosslinked product obtained by dynamically heat-treating in the presence of a crosslinking agent a mixture composed of (a) a crosslinking olefin copolymer, which is an ethylene-α-olefin copolymer composed of ethylene and an α-olefin having 3 to 20 carbon atoms or which is an ethylene-α-olefin-non-conjugated diene copolymer composed of ethylene, an α-olefin having 3 to 20 carbon atoms and a non-conjugated diene, and (b) a decomposable olefin plastic, which is a homopolymer or copolymer in which a content of an α-olefin having 3 to 20 carbon atoms is from 50 to 100 mole %.

The present invention is useful especially in the process for the production of expanded products by injection molding or extrusion.

DESCRIPTION OF THE PREFERRED EMBODIMENTS

Figure 1:
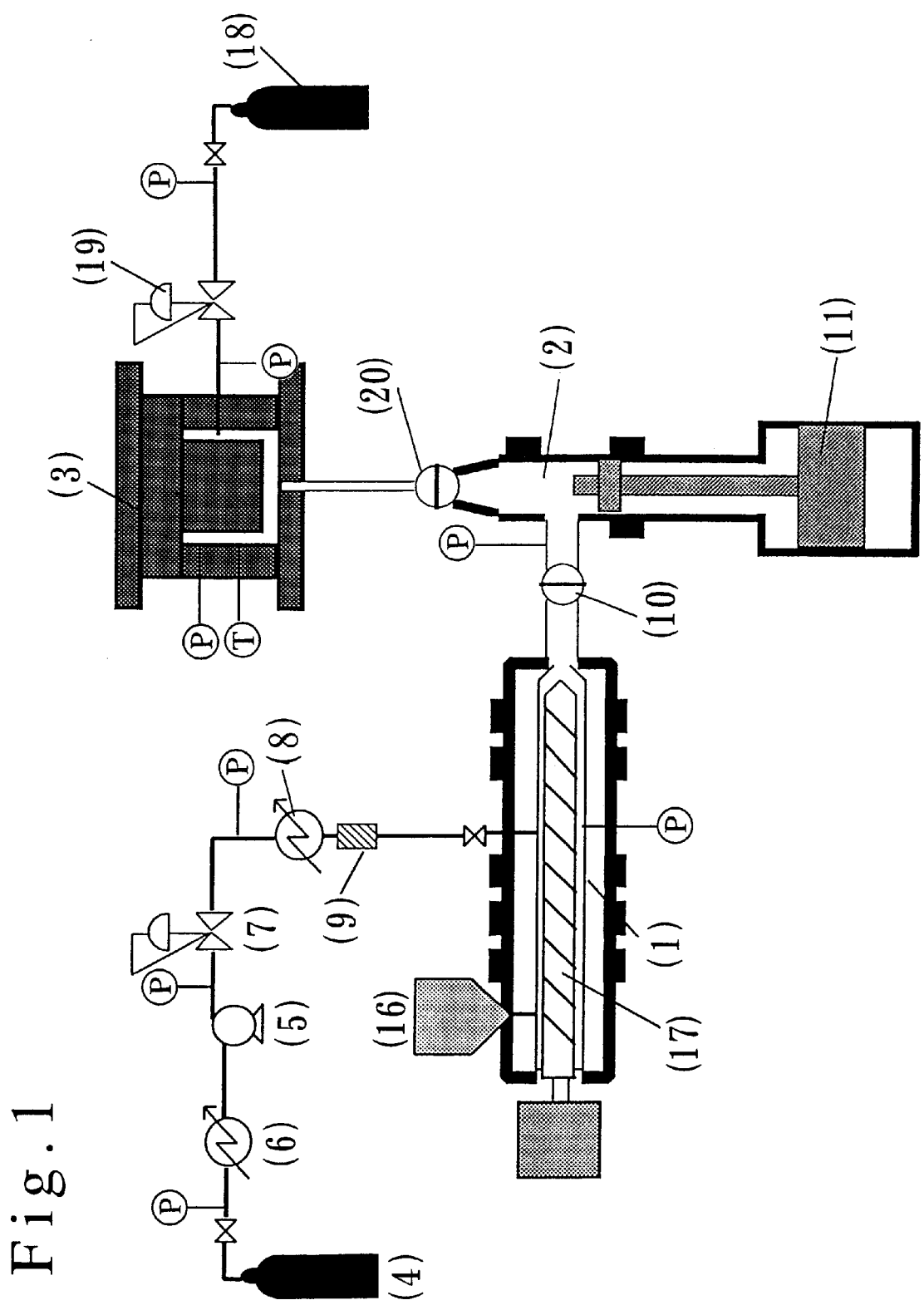
FIG. 1 is a schematic construction diagram illustrating a process according to a first embodiment of the present invention for the production of an expanded olefinic thermoplastic elastomer product.

Described specifically, the present invention embraces therein the following invention and embodiments.

[1] A process for producing an expanded product with carbon dioxide as a blowing agent, which comprises:

as a gas-dissolving step, adding carbon dioxide to a molten olefinic thermoplastic elastomer (A) selected from the below-described elastomers (A-1) to (A-3) in a proportion of 0.1 to 30 parts by weight of the carbon dioxide per 100 parts by weight of the molten olefinic thermoplastic elastomer (A), and forming a molten olefinic thermoplastic elastomer composition in which the olefinic thermoplastic elastomer and the carbon dioxide are in a mutually-dissolved state; and as a cooling step, lowering the molten olefinic thermoplastic elastomer composition in temperature.

(A-1) an ethylene-α-olefin copolymer composed of ethylene and an α-olefin having 3 to 20 carbon atoms;

(A-2) an ethylene-α-olefin-non-conjugated diene copolymer composed of ethylene, an α-olefin having 3 to 20 carbon atoms and a non-conjugated diene; and (A-3) a crosslinked product obtained by dynamically heat-treating in the presence of a crosslinking agent a mixture composed of (a) 60 to 95 parts by weight of a crosslinking olefin copolymer, which is an ethylene-α-olefin copolymer composed of ethylene and an α-olefin having 3 to 20 carbon atoms or which is an ethylene-α-olefin-non-conjugated diene copolymer composed of ethylene, an α-olefin having 3 to 20 carbon atoms and a non-conjugated diene, and (b) 5 to 40 parts by weight of a decomposable olefin plastic, which is a homopolymer or copolymer in which a content of an α-olefin having 3 to 20 carbon atoms is from 50 to 100 mole % and which has a melt flow rate of from 0.5 to 80 g/10 minutes as measured in accordance with ASTM D-1238-65T, with a proviso that a sum of the component (a) and the component (b) is 100 parts by weight.

[2] The process described above under [1], wherein as the olefinic thermoplastic elastomer, a composition composed of 100 parts by weight of the thermoplastic elastomer (A) selected from the elastomers (A-1) to (A-3) and 5 to 100 parts by weight of an olefin plastic (B), which is a homopolymer or copolymer in which a content of an $\alpha$-olefin having 2 to 20 carbon atoms is from 50 to 100 mole % and which has a melt flow rate of from 0.01 to 2 g/10 minutes as measured in accordance with ASTM D-1238-65T, is used.

[3] The process described above under [1] or [2], wherein in the gas-dissolving step, carbon dioxide is added in a proportion of from 0.1 to 20 parts by weight.

[4] The process described above under [1] or [2], which is a process for producing an expanded olefinic thermoplastic elastomer by injection molding and comprises:
  (i) as a gas-dissolving step, melting 100 parts by weight of an olefinic thermoplastic elastomer at 100 to 300° C. in a resin-plasticating cylinder (1) equipped with a feed line through which a blowing agent is added to the molten thermoplastic resin, adding carbon dioxide in a proportion of from 0.1 to 30 parts by weight per 100 parts by weight of the olefinic thermoplastic elastomer, and forming a molten olefinic thermoplastic elastomer composition in which the olefinic thermoplastic elastomer and the carbon dioxide are in a mutually-dissolved state;
  (ii) as a cooling step, cooling the molten olefinic thermoplastic elastomer composition to a temperature, which is from 50 to 250° C. and is equal to or higher than a plasticizing temperature of the molten olefinic thermoplastic elastomer composition, in the resin-plasticating cylinder (1);
  (iii) as a metering and injection step, metering the thus-cooled molten olefinic thermoplastic elastomer composition and injecting the same into a mold (3); and
  (iv) as an expansion control step, inducing formation of cell nuclei to control an expansion ratio by lowering a pressure in the mold (3).

[5] The process described above under any one of [1]–[3], which comprises:
  (i) as a gas dissolving step, melting an olefinic thermoplastic elastomer at a temperature equal to or higher than a plasticizing temperature of the olefinic thermoplastic elastomer in a continuous plasticator equipped with a feed line through which a blowing agent is added to the molten olefinic thermoplastic elastomer, adding carbon dioxide in a proportion of from 0.1 to 20 parts by weight per 100 parts by weight of the olefinic thermoplastic elastomer, and forming a molten olefinic thermoplastic elastomer composition in which the olefinic thermoplastic elastomer and the carbon dioxide are in a mutually-dissolved state;
  (ii) as a cooling step, cooling the molten olefinic thermoplastic elastomer composition to a temperature, which is equal to or higher than a plasticizing temperature of the molten olefinic thermoplastic elastomer composition, is higher by 50° C. or less than the plasticizing temperature of the molten olefinic thermoplastic elastomer composition and is equal to or lower than the melting temperature in the gas dissolving step, at a tip portion of the continuous plasticator;
  (iii) as a cell nuclei forming step, extruding the molten olefinic thermoplastic elastomer composition through a die connected to the tip portion of the continuous plasticator and set to an optimal expansion temperature of the molten olefinic thermoplastic elastomer composition, whereby a pressure of the molten olefinic thermoplastic elastomer composition is lowered to a pressure equal to or lower than a critical pressure of carbon dioxide to induce formation of cell nuclei; and
  (iv) as an expansion control step, rapidly cooling the thus-extruded expanded thermoplastic resin product to a temperature equal to or lower than a crystallization temperature of the olefinic thermoplastic elastomer.

[6] The process described above under any one of [1]–[5], wherein upon adding carbon dioxide in the gas-dissolving step, the carbon dioxide is added to the molten olefinic thermoplastic elastomer after charging the carbon dioxide into a predetermined amount deliverable pump while allowing the carbon dioxide to remain in a liquefied state, delivering the thus-charged carbon dioxide with a delivery pressure of the predetermined amount deliverable pump controlled by a pressure control valve (7) such that the delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert the carbon dioxide into supercritical carbon dioxide.

[7] The process described above under any one of [1]–[6], wherein the $\alpha$-olefin for forming the ethylene-$\alpha$-olefin copolymer or ethylene-$\alpha$-olefin-non-conjugated diene copolymer as the crosslinking olefin copolymer (a) is propylene or 1-butene.

[8] The process described above under any one of [1]–[6], wherein the decomposable olefin plastic (b) is isotactic polypropylene or a propylene-$\alpha$-olefin copolymer.

[9] The process described above under any one of [1]–[6], wherein the thermoplastic elastomer (A) has been subjected to heat treatment in the presence of a crosslinking agent and divinylbenzene.

[10] The process described above under any one of [1]–[6], wherein the thermoplastic elastomer (A) has been partially crosslinked.

[11] The process described above under any one of [2]–[6], wherein the olefin plastic (B) is isotactic polypropylene or a propylene-$\alpha$-olefin copolymer.

[12] The process described above under any one of [1]–[6], wherein the molten olefinic thermoplastic elastomer composition further comprises a chemical blowing agent capable of producing gas, which contains carbon dioxide and/or nitrogen, through thermal decomposition.

[13] The process described above under [12], wherein the chemical blowing agent capable of producing the gas, which contains carbon dioxide and/or nitrogen, through thermal decomposition is sodium hydrogencarbonate and/or citric acid.

[14] The process described above under [4], wherein the expansion control step is performed by releasing a high-pressure gas filled in a mold and/or causing at least a portion of a core of the mold to move backward subsequent to the injection of the molten olefinic thermoplastic elastomer composition.

[15] An expanded laminate comprising a thermoplastic resin structural member and an expanded olefinic thermoplastic elastomer product obtained by the process described above under [4].

[16] A process for the production of an expanded laminate, which comprises placing a thermoplastic resin structural member in a mold and then laminating the expanded olefinic thermoplastic elastomer product, which is described above under [15], by injection molding.

In the specification and claims of this invention, the term "predetermined amount deliverable pump" means a pump which can deliver continuously and stably a predetermined amount of carbon dioxide per unit of time, within a range of the deliverable capacity of said pump, into a molten thermoplastic resin.

The term "olefinic thermoplastic elastomer" as used herein means a thermoplastic elastomer (A) selected from the above-described elastomers (A-1) to (A-3) or a composition composed of the thermoplastic elastomer (A) and an olefin plastic (B).

The term "olefinic thermoplastic elastomer" as used herein also embraces therein compositions of olefinic thermoplastic elastomers and thermally-decomposable blowing agents, aliphatic carboxylic acids and derivatives thereof, inorganic fine powder and the like added to the olefinic thermoplastic elastomers as needed.

The term "molten olefinic thermoplastic elastomer composition" as used herein means a state in which carbon dioxide as a blowing agent and a molten olefinic thermoplastic elastomer are mixed evenly.

Examples of the thermoplastic elastomer (A), which makes up the olefinic thermoplastic elastomer usable in the present invention, include (A-1) ethylene-propylene copolymers (EPM), ethylene-butene copolymers (EBM), propylene-butene copolymers (PBM) and ethylene-octene copolymers (EOM); and (A-2) crosslinked olefin copolymers such as ethylene-propylene-diene copolymers (EPDM). They also include (A-3) crosslinked thermoplastic elastomers composed of (a) crosslinking olefin copolymers and (b) decomposable olefin plastics. Among these, (A-3) crosslinked thermoplastic elastomers composed of (a) crosslinking olefin copolymers and (b) decomposable olefin plastics are particularly preferred.

Each crosslinked thermoplastic elastomer (A-3), which is a preferred example of the thermoplastic elastomer (A), is a thermoplastic elastomer in which as a result of immense occurrence of a crosslinking reaction and as a result of immense occurrence of a decomposition reaction in a competitive reaction involving the decomposition reaction and the crosslinking reaction, said competitive reaction taking place upon reacting a crosslinking olefin copolymer (a) and a decomposable olefin plastic (b) under heat in the presence of a crosslinking agent, moieties increasing the molecular weight of the polymer in the composition and moieties decreasing the molecular weight of the polymer in the composition exist together.

The term "crosslinking olefin copolymer (a)" usable in the present invention means an elastic copolymer of amorphous random structure composed of ethylene and an α-olefin having 3 to 20 carbon atoms or an elastic copolymer of amorphous random structure composed of ethylene, an α-olefin having 3 to 20 carbon atoms and a non-conjugated diene, which is an olefin copolymer which, when mixed with a crosslinking agent and kneaded under heat, undergoes crosslinking so that its flowability is lowered or it becomes no longer flowable.

Specific examples of such a crosslinking olefin copolymer (a) can include the following rubbers:

(1) ethylene-α-olefin copolymers [ethylene/α-olefin (molar ratio)=about 90/10 to 50/50], and (2) ethylene-α-olefin-non-conjugated diene copolymers [ethylene/α-olefin (molar ratio)=about 90/10 to 50/50].

Specific examples of the non-conjugated diene can include dicyclopentadiene, 1,4-hexadiene, cyclooctadiene, methylene norbornene, and ethylene norbornene. Their iodine values may range from 3 to 25, with about 5 to 20 being preferred.

Among these, ethylene-propylene copolymer, ethylene-propylene-non-conjugated diene copolymers, ethylene-1-butene copolymer, ethylene-1-butene-non-conjugated diene copolymers are preferred. In particular, ethylene-propylene-non-conjugated diene copolymers, especially ethylene-propylene-ethylidene norbornene copolymers is preferred in that a thermo-plastic elastomer (A-3) having a suitable crosslinking structure is obtained.

The Mooney viscosity [$ML_{1+4}$ (100° C.)] of the crosslinking olefin copolymer (a) may preferably be in a range of from 10 to 250, notably from 30 to 150. On the other hand, the iodine value of the crosslinking olefin copolymer (a) may preferably be 25 or lower. When the iodine value of the crosslinking olefin copolymer (a) falls within such a range, a thermo-plastic elastomer (A-3) crosslinked with a good balance is obtained.

In the crosslinked thermoplastic elastomer (A-3), the above-described crosslinking olefin copolymer (a) may be used in a proportion of from 60 to 95 parts by weight, preferably from 70 to 90 parts by weight per 100 parts by weight of the sum of the crosslinking olefin copolymer (a) and the decomposable olefin plastic (b).

In the present invention, a rubber other than the crosslinking olefin copolymer (a) can be used in combination with the crosslinking olefin copolymer (a) to an extent not detrimental to the objects of the present invention. Illustrative of the rubber other than the crosslinking olefin copolymer (a) are diene rubbers such as styrene-butadiene rubber (SBR), nitrile rubber (NBR) and natural rubber (NR); and silicone rubbers.

The term "decomposable olefin plastic (b)" usable in the present invention means a homopolymer or copolymer containing 50 to 100 mole % of an α-olefin having 3 to 20 carbon atoms, which is an olefin plastic which, when mixed with a crosslinking agent and kneaded under heat, undergoes thermal decomposition so that its molecular weight is reduced to increase the flowability of the thermoplastic elastomer.

Specific examples of the decomposable olefin plastic (b) can include the following homopolymers and copolymers:

(1) propylene homopolymer, (2) random copolymers between propylene and 10 mole % or less of other α-olefins, (3) block copolymers between propylene and 30 mole % or less of other α-olefins, (4) 1-butene homopolymer, (5) random copolymers between 1-butene and 10 mole % or less of other α-olefins, (6) 4-methyl-1-pentene homopolymer, and (7) random copolymers between 4-methyl-1-pentene and 20 mole % or less of other α-olefins.

Specific examples of the α-olefins can include ethylene, propylene, 1-butene, 4-methyl-1-pentene, 1-hexene and 1-octene.

Among the above-described decomposable olefin plastics (b), propylene homopolymer and propylene-α-olefin copolymers falling under the above definitions (1) to (7) and having propylene contents of 50 mole % or higher, for example, propylene-ethylene copolymer, propylene-1-butene copolymer, propylene-1-hexene copolymer, propylene-4-methyl-1-pentene copolymer and the like are particularly preferred.

The melt flow rate of the decomposable olefin plastic (b) as measured in accordance with ASTM D-1238-65T may be in a range of from 0.5 to 80 g/10 minute, especially from 0.5 to 20 g/10 minute, more preferably from 3 to 20 g/10 minute.

In the present invention, the decomposable olefin plastic (b) plays a role in the improvements of the flowability and heat resistance of the thermoplastic elastomer (A). The above-described decomposable olefin plastic (b) may be used in a proportion of from 5 to 40 parts by weight, preferably from 10 to 30 parts by weight per 100 parts by weight of the sum with the above-mentioned crosslinking olefin copolymer (a). Use of the decomposable olefin plastic (b) in the above-described proportion leads to an expanded product excellent in flexibility.

The thermoplastic elastomer (A) may contain a non-crosslinking rubbery substance (c) in addition to the aforementioned crosslinking olefin copolymer (a) and decomposable olefin plastic (b).

This non-crosslinking rubbery substance (c) is a rubbery hydrocarbon substance which, even when mixed with a crosslinking agent and kneaded under heat, hardly undergoes crosslinking so that its flowability can be hardly lowered. Specific examples can include polyisobutylene, butyl rubber, propylene-ethylene random copolymers containing 70 mole % of more of propylene, and propylene-1-butene random copolymers. Among these, polyisobutylene and butyl rubber are preferred for their performance and handling ease. In particular, polyisobutylene and butyl rubber the Mooney viscosities [$ML_{1+4}$ (100° C.)] of which are 80 or lower are preferred in that they can improve the flowability of the thermoplastic elastomer (A).

Incidentally, the term "crosslinking" as used herein indicates a phenomenon that as a result of immense occurrence of a crosslinking reaction in a competitive reaction which involves a decomposition reaction and the crosslinking reaction and takes place when a polymer and a crosslinking agent are reacted under heat, the apparent molecular weight of the polymer increases. On the other hand, the term "decomposable" as used herein indicates a phenomenon that as a result of immense occurrence of the crosslinking reaction, the apparent molecular weight of the polymer decreases.

The above-described non-crosslinking rubbery substance (c) may be used, as needed, in a proportion of from 5 to 100 parts by weight, preferably from 5 to 30 parts by weight per 100 parts by weight of the sum of the crosslinking olefin copolymer (a) and the decomposable olefin plastic (b).

Further, the thermoplastic elastomer (A) employed in the present invention may contain a mineral-oil-base softening agent (d) in addition to the crosslinking olefin copolymer (a), the decomposable olefin plastic (b) and the non-crosslinking rubbery substance (c).

Illustrative of the mineral-oil-base softening agent (d) are petroleum fractions of high boiling points, which upon rolling rubber, are generally used to weaken intermolecular force of the rubber so that its processing is facilitated and the dispersion of carbon black or the like is promoted or the hardness of the vulcanized rubber is lowered to increase its flexibility. These petroleum fractions are classified into paraffin fractions, naphthene fractions and aromatic fractions.

The mineral-oil-base softening agent (d) may be used in a proportion of from 5 to 100 parts by weight, preferably from 5 to 80 parts by weight, more preferably from 15 to 50 parts by weight per 100 parts by weight of the sum of the crosslinking olefin copolymer (a) and the decomposable olefin plastic (b). Use of the mineral-oil-base softening agent (d) in such a proportion as described above makes it possible to sufficiently improve the flowability of the thermoplastic elastomer (A) without reducing the heat resistance and tensile characteristics of an expanded product.

In the present invention, one or more other softening agents can also be used in addition to the above-described mineral-oil-base softening agent (d) as needed to an extent not detrimental to the objects of the present invention. As softening agents which are other than the mineral-oil-base softening agent (d) and are usable as needed in the present invention, softening agents commonly employed in rubbers are suited. Specific examples can include synthetic or petroleum substances such as process oil, lubricating oil, paraffin, liquid paraffin, polyethylene wax, polypropylene wax, petroleum asphalt and vaseline; coal tars such as coal tar and coal tar pitch; fatty oils such as castor oil, linseed oil, rapeseed oil, soybean oil and coconut oil; waxes such as tall oil, bees wax, carnauba wax and lanolin; fatty acids such as ricinolic acid, palmitic acid, stearic acid, 12-hydroxylated stearic acid, montanic acid, oleic acid and erucic acid, and/or metal salts thereof; synthetic polymers such as petroleum resins, coumarine-indene resin and atactic polypropylene; ester-base plasticizers such as dioctyl phthalate, dioctyl adipate and dioctyl sebacate; micro-crystalline wax; liquid polybutadiene, and modified or hydrogenated products thereof; and liquid thiokol.

The crosslinked thermoplastic elastomer (A) usable in the present invention can be obtained by dynamically heat-treating in the presence of a crosslinking agent a mixture to be crosslinked, said mixture comprising the crosslinking olefin copolymer (a), the decomposable olefin plastic (b) and the optional non-crosslinking rubbery substance (c) and mineral-oil-base softening agent (d) as mentioned above.

Usable examples of the crosslinking agent can include those generally employed in thermosetting rubbers, such as organic peroxides, sulfur, phenol resins, amino resins, quinone and derivatives thereof, amine compounds, azo compounds, epoxy compounds, and isocyanates. Among these, organic peroxides are particularly preferred.

Specific examples of organic peroxides can include dicumyl peroxide, di-tert-butyl peroxide, 2,5-dimethyl-2,5-di(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylbenzyloxy)valerate, benzoyl peroxide, p-chlorobenzoyl peroxide, 2,4-dichlorobenzoyl peroxide, tert-butylperoxy benzoate, tert-butylperoxy isopropylcarbonate, diacetyl peroxide, lauroyl peroxide, and tert-butylcumyl peroxide.

Among these, from the standpoint of offensive odor and scorch stability, 2,5-dimethyl-2,5-di(tertbutylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethylcyclohexane and n-butyl-4,4-bis(tert-butylperoxy) valerate are preferred, with 1,3-bis(tert-butylperoxyisopropyl)benzene being especially preferred.

In the present invention, the crosslinking agent may be added in a proportion of from 0.05 to 3 parts by weight, preferably from 0.1 to 2 parts by weight per 100 parts by weight of the sum of the crosslinking olefin copolymer (a) and the decomposable olefin plastic (b).

In the present invention, one or more crosslinking aids selected from the group consisting of peroxy crosslinking aids, polyfunctional methacrylate monomers and polyfunctional vinyl monomers can be added upon performing crosslinking with the above-described crosslinking agent. Illustrative of the peroxy crosslinking aids are sulfur, p-quinone dioxime, p,p'-dibenzoylquinone dioxime, N-methyl-N-4-dinitrosoaniline, nitrosobenzene, diphenylguanidine, and trimethylol-N,N'-m-phenylene dimaleimide. Illustrative of polyfunctional methacrylate monomers are divinylbenzene, triallyl cyanurate, ethylene glycol dimethacrylate, diethylene glycol dimethacrylate, polyethylene glycol dimethacrylate, trimethylolpropane trimethacrylate, and allyl methacrylate. Illustrative of the polyfunctional vinyl monomers are vinyl butyrate and vinyl stearate.

Owing to the use of such compounds as described above, a uniform and gentle crosslinking reaction can be expected. Among the above-described crosslinking aids, divinylbenzene can provide a thermoplastic elastomer (A-3) crosslinked with a good balance between flowability and physical properties in the present invention because it has good compatibility with the crosslinking olefin copolymer (a) and the decomposable olefin plastic (b) as the principal components of the mixture to be crosslinked, has an action to solubilize the crosslinking agent and acts as a dispersant for the crosslinking agent, and exhibits uniform crosslinking effect upon heat treatment.

In the present invention, the above-described crosslinking aid may be used preferably in a proportion of from 0.1 to 3 wt. %, especially from 0.3 to 2 wt. % based on the whole mixture to be crosslinked. When the proportion of the crosslinking agent falls within the above range, the resulting crosslinked thermoplastic elastomer (A-3) does not develop changes in physical properties due to a thermal history upon molding or other forming because the crosslinking aid no longer exists as an unreacted monomer in the elastomer, and moreover, the resulting crosslinked thermoplastic elastomer (A) is excellent in flowability.

The above expression "dynamically heat-treated" means that components such as those described above are kneaded in a molten state. Dynamic heat treatment can be performed using a kneading apparatus such as an open mill roll or a non-open Banbury mixer, kneader, single-screw or twin-screw extruder or continuous mixer. It is however preferred to conduct it in a non-open kneading apparatus. Further, it is also preferred to conduct the dynamic heat treatment in an atmosphere of an inert gas such as nitrogen or carbon dioxide.

It is also preferred to conduct this kneading at such a temperature that the half time of the crosslinking agent employed becomes shorter than 1 minute. The kneading temperature may generally range from 150 to 280° C., preferably from 170 to 240° C., while the kneading time may range from 1 to 20 minutes, preferably from 1 to 5 minutes. Shear force which is applied upon kneading can be set at a level within a range of from 10 to $10^4$ $sec^{-1}$, preferably from $10^2$ to $10^4$ $sec^{-1}$ in terms of shear rate.

As a preferred method for mixing and kneading the above-described individual components when the crosslinked thermoplastic elastomer (A-3) is used as the thermoplastic elastomer (A) in a preferred embodiment of the present invention, it is desired to adopt such a method that the crosslinking olefin copolymer (a), the decomposable olefin plastic (b) and optionally, the non-crosslinking rubber (c) and the mineral-oil-base softening agent (d) and the like are mixed together beforehand and are kneaded and pelletized, and the thus-obtained pellets, the crosslinking agent dissolved in divinyl benzene and optionally, the crosslinking aid and a vulcanization accelerator are uniformly mixed preferably at a temperature equal to or lower than 50° C. in a known kneader such as a Brabender tumbling mixer, a twin-cylinder Brabender mixer or a Henschel mixer and are then kneaded there under the above-described predetermined conditions.

The crosslinked thermoplastic elastomer (A-3) is obtained from the crosslinking olefin copolymer (a) as described above. In the present invention, the gel content of the thermoplastic elastomer may range from 10 to 100 wt. %, preferably from 20 to 98%, notably from 30 to 97%.

In the present invention, each gel content was measured by the method to be described hereinafter.

A sample of a thermoplastic elastomer was weighed as much as about 100 mg. This sample is cut into shreds of 0.5 mm×0.5 mm×0.5 mm, and in a closed container, the shreds so obtained are then immersed at 23° C. for 48 hours in 30 ml of cyclohexane.

The sample is next taken out onto a sheet of filter paper, followed by drying at room temperature for 72 hours or longer until its weight becomes constant. A value, which is obtained by subtracting the weight of cyclohexane-insoluble matters (fibrous filler, filler, pigment, etc.) other than the polymer components from the weight of the dried residue, is calculated as a "corrected final weight (Y)".

On the other hand, a value, which is obtained by subtracting the weight of cyclohexane-soluble matters (for example, softening agent) other than the polymer components and the weight of cyclohexane-insoluble matters (fibrous filler, filler, pigment, etc.) other than the polymer components from the weight of the sample, is calculated as a "corrected initial weight (X)".

From these values, the gel content (cyclohexaneinsoluble matter) can be determined in accordance with the following formula:

Gel content (wt. %)=[corrected final weight (Y)/corrected initial weight (X)]×100

The olefin plastic (B) usable in the present invention is a homopolymer or copolymer which contains 50 to 100 mole % of an α-olefin having 2 to 20 carbon atoms. Specific examples can include the following homopolymers and copolymers:

(1) ethylene homopolymer (its production process may be either a low pressure process or a high pressure process), (2) copolymers between ethylene and 10 mole % or less of other α-olefins or vinyl monomers such as vinyl acetate and ethyl acrylate, (3) propylene homopolymer, (4) random copolymers between propylene and 10 mole % or less of other α-olefins, (5) block copolymers between propylene and 30 mole % or less of other α-olefins, (6) 1-butene homopolymer, (7) random copolymers between 1-butene and 10 mole % or less of other α-olefins, (8) 4-methyl-1-pentene homopolymer, and (9) random copolymers between 4-methyl-1-pentene and 20 mole % or less of other α-olefins.

Specific examples of the above-described α-olefins can include ethylene, propylene, 1-butene, 4-methyl-1-pentene, 1-hexene, and 1-octene.

Among the olefin plastics described above, propylene homopolymer and propylene-α-olefin copolymers the propylene contents of which are 50 mole % or higher are particularly preferred.

The above-exemplified olefin plastics (B) can be used either singly or in combination. The melt flow rates of these olefin plastics (B) as measured in accordance with ASTM D-1238 may preferably range from 0.01 to 2 g/10 minute, with a range of from 0.02 to 2 g/10 minute being more preferred.

Use of an olefin plastic (B) having such a melt flow rate as that described above can provide the resulting olefinic thermoplastic elastomer with an improved melt tension, thereby making it possible to obtain an expanded product of high expansion ratio.

The thermoplastic elastomer (A) and the olefin plastic (B) are both essential components in extrusion, and are used in proportions of from 50 to 99 parts by weight and from 1 to 50 parts by weight, preferably from 75 to 99 parts by weight and from 1 to 25 parts by weight, more preferably from 90–99 parts by weight and 1 to 10 parts by weight, respectively, out of 100 parts by weight of the olefinic thermoplastic elastomer. Use of the olefinic plastic (B) in such a proportion as described above is preferred, because an expanded product of high expansion ratio excellent in flexibility and unavailable from the single use of the thermoplastic elastomer (A) can be obtained.

In injection molding, on the other hand, expansion is feasible even from the single use of the thermoplastic elastomer (A) although no reason has been ascertained. When the thermoplastic elastomer (A) and the olefinic plastic (B) are mixed, their proportions can be chosen as desired depending on the application field and purpose.

When the olefinic plastic (B) is used in the present invention, it is preferred to add the olefinic plastic (B) after the crosslinked thermoplastic elastomer (A-3) has been prepared. If the olefin plastic (B) is added to the various components, such as the crosslinking olefin copolymer (a), of the crosslinked thermoplastic elastomer (A-3) and the resulting mixture is mixed with a crosslinking agent and is then kneaded under heat, the olefin plastic (B), depending on its kind, may be thermally decomposed and reduced in molecular weight or may be crosslinked and gelled by heat, thereby possibly failing to obtain an expanded product as intended.

The temperature and load for the measurement of the melt flow rates of the decomposable olefin plastic (b) and the olefin plastic (B), which may be used in the present invention, can be set using the conditions specified under the ASTM as indexes. For example, the measuring temperature and load can be set at 230° C. and 2.16 kg/cm$^2$ for polypropylene and at 190° C. and 2.16 kg/cm$^2$ for polyethylene. Other conditions can be set following the corresponding conditions prescribed under ASTM D1238.

Carbon dioxide which is employed as a blowing agent in the present invention may be used in a proportion of from 0.1 to 30 parts by weight, preferably from 0.1 to 20 parts by weight, more preferably from 0.2 to 20 parts by weight, especially from 0.2 to 10 parts by weight per 100 parts by weight of the olefinic thermoplastic elastomer.

If the proportion of the blowing agent is smaller than 0.1 part by weight, no sufficient expansion ratio can be obtained. A proportion greater than 30 parts by weight leads to the occurrence of a large expansion force from the added carbon dioxide, resulting in an expanded product with a surface of blister-like defective external appearance. To form the olefinic thermoplastic elastomer into a desired shape, the cooling step has to be made longer in time. This also requires a longer time for the production, so that the efficiency of production is reduced.

This carbon dioxide may preferably be in a super-critical state within the molding or otherwise forming machine in view of its solubility, penetrability, diffusibility and the like into the molten olefinic thermoplastic elastomer.

As an illustrative method for adding the blowing agent into the molten olefinic thermoplastic elastomer, carbon dioxide in a gaseous form may be charged either as is or in a pressurized state, or carbon dioxide in a liquefied form may be added by a plunger pump or the like.

As illustrated in FIG. 1, for example, carbon dioxide is charged into a predetermined amount deliverable pump 5 from a liquefied carbon dioxide cylinder 4 while the carbon dioxide is allowed to remain in a liquefied state. After the carbon dioxide is delivered with the delivery pressure of the predetermined amount deliverable pump 5 controlled constant within a range of from a critical pressure (7.4 MPa) of carbon dioxide to 40 MPa, the carbon dioxide is heated to a critical temperature (31° C.) of carbon dioxide or higher to convert the carbon dioxide into supercritical carbon dioxide. This supercritical carbon dioxide is then added to the molten olefinic thermoplastic elastomer. This method can be suitably employed.

The present invention also permits combined use of one or more blowing agents of the thermal decomposition type with carbon dioxide. The blowing agents give off carbon dioxide or nitrogen upon thermal decomposition and act as expansion nucleating agents to make expansion uniform. Examples of blowing agents of the thermal decomposition type include azodicarbonamide, N,N-dinitrosopentatetramine, azobisisobutyronitrile, citric acid, and sodium hydrogencarbonate. When a blowing agent of the thermal decomposition type is used, it can be used in a proportion of from 0.01 to 10 parts by weight, preferably from 0.01 to 5 parts by weight, and the sum of the blowing agent of the thermal decomposition type and carbon dioxide may preferably range from 0.1 to 30 parts by weight, more preferably from 0.1 to 20 parts by weight, all per 100 parts by weight of the thermoplastic elastomer. Use of the blowing agent of the thermal decomposition type tends to provide the resulting expanded product with a uniform cell diameter.

To provide a resulting expanded product with a good surface appearance without cell collapse, one or more of various additives may be added to an olefinic thermoplastic elastomer for use in the present invention. As these additives, known additives employed in general expansion molding can be used. For example, aliphatic carboxylic acids and derivatives thereof can be used suitably.

Examples of the aliphatic carboxylic acids and derivatives thereof include aliphatic carboxylic acids, acid anhydrides, alkali metal salts, alkaline earth meal salts, and the like. As aliphatic carboxylic acids, aliphatic carboxylic acids having 3–30 carbon atoms are suited, for example, lauric acid, stearic acid, crotonic acid, oleic acid, maleic acid, glutaric acid, and montanic acid. From the viewpoints of the dispersibility and solubility in the resin and effects or the like in improving the surface appearance, stearic acid, derivatives of stearic acid, montanic acid and derivatives of montanic acid are preferred. Of these, alkali metal salts and alkaline earth metal salts of stearic acid, especially zinc stearate and calcium stearate are particularly preferred.

The proportion of such an additive may range from 0.01 to 10 parts by weight, preferably from 0.05 to 8 parts by weight, more preferably from 0.1 to 5 parts by weight, all per 100 parts by weight of the olefinic thermoplastic elastomer.

A proportion of the additive equal to or greater than 0.01 part by weight can easily prevent an expanded product from cell collapse, and a proportion of the additive equal to or smaller than 10 parts by weight allows the resin to retain a viscosity sufficient to withstand a gas pressure during expansion, thereby making it possible to provide an improved surface appearance without developing cell collapse.

As an additive to the olefinic thermoplastic elastomer, the present invention also permits use of fine inorganic powder which acts as an expansion nucleating agent. Examples of the fine inorganic powder include talc, calcium carbonate, clay, magnesium oxide, zinc oxide, glass beads, glass powder, titanium oxide, carbon black, and anhydrous silica. Among these, talc, calcium carbonate, titanium oxide and anhydrous silica are preferred, with talc being particularly preferred. Their particle sizes are required to be 50 $\mu$m or smaller, preferably 10 $\mu$m or smaller, more preferably 5 $\mu$m or smaller.

Use of a fine inorganic powder the particle size of which is 50 $\mu$m or smaller can provide an expanded product with a better surface appearance.

When a fine inorganic powder is used, its proportion may be in a range of from 0.01 to 40 parts by weight, preferably from 0.05 to 20 parts by weight, more preferably from 0.05 to 10 parts by weight, still more preferably from 0.1 to 5 parts by weight, all per 100 parts by weight of the olefinic thermoplastic elastomer.

When a fine inorganic powder is added in a proportion equal to or greater than 0.1 part by weight but equal to or smaller than 40 parts by weight, the resulting expanded product is provided with a good surface appearance. The addition of such a fine inorganic powder in the above range is therefore preferred.

To the extent not impairing the characteristics of the present invention, the above-described olefinic thermoplastic elastomer can be added with additives or the like, which are other than the fine inorganic powder, aliphatic carboxylic acid and derivatives thereof exemplified above, as needed depending on the purpose and application field. These other additives and the like include resins such as various elastomers, styrene resins (for example, polystyrene, butadiene-styrene copolymer, acrylonitrile-styrene copolymer, acrylonitrile-butadiene-styrene copolymer, etc.), ABS resin, polyethylene, polypropylene, ethylene-propylene resin, ethylene-ethyl acrylate resin, polyvinyl chloride, polyvinylidene chloride, polybutene, polycarbonates, polyacetals, polyphenylene oxide, polyvinyl alcohol, polymethyl methacrylate, saturated polyester resins (for example, polyethylene terephthalate, polybutylene terephthalate, etc.), biodegradable polyesters (for example, hydroxycarboxylic condensation products such as polylactic acid, diol-dicarboxylic acid condensation products such as polybutylene succinate, etc.), polyamide resins, polyimide resins, fluorinated resins, polysulfones, polyethersulfones, polyarylates, polyetheretherketones and liquid crystal polymers and mixtures thereof; peroxides; sulfur; process oils; anti-block additives; plasticizers; pigments; stabilizers; fillers; and metal powders.

No particular limitation is imposed on the production method of the olefinic thermoplastic elastomer which is used as a raw material for the expanded olefinic thermoplastic elastomer product in the present invention, and a conventionally known method can be adopted. For example, the olefinic thermoplastic elastomer can be prepared by forming the thermoplastic elastomer (A), the above-described additives and the like and optionally, the olefinic plastic (B) into an intimate mixture with a high-speed stirrer or the like and then melting and kneading the resultant mixture with a single screw or multi-screw extruder, mixing roll, kneader, Brabender mixer or the like which has sufficient kneading ability.

As an alternative, the thermoplastic elastomer (A), the above-described additives and the like and optionally, the olefinic plastic (B) can also be used in an intimately mixed state without inconvenience.

Until completion of the gas dissolving step and cooling step, care should be exercised to prevent escape of carbon dioxide from the molten olefinic thermoplastic elastomer composition, which is composed of the olefinic thermoplastic elastomer, carbon dioxide as a blowing agent and a blowing agent of the thermal decomposition time, an aliphatic carboxylic acid or a derivative thereof, inorganic fine powder and the like, which may be added as needed. For this purpose, it is preferred to maintain the molten olefinic thermoplastic elastomer composition under a pressure above the critical pressure of carbon dioxide.

Concerning matters other than those specified in the present invention, no particular limitation is imposed on the process of the present invention for the production of the expanded olefinic thermoplastic elastomer product. Forming machines usable in known resin processing processes—such as extrusion, injection molding, blow molding, extrusion blow molding, injection blow molding, inflation molding, stamping molding, compression molding, beads molding—can be employed. The continuous plasticators, which are referred to herein, should be included in these forming machines. Further, the expanded olefinic thermoplastic elastomer product according to the present invention can also be produced by a process which comprises impregnating with carbon dioxide an olefinic thermoplastic elastomer in an autoclave and then releasing the pressure or heating the impregnated elastomer to obtain an expanded product.

Further, the process of the present invention for the production of the expanded olefinic thermoplastic elastomer product is not specifically limited in the shape of the product. For example, no limitation is imposed on the shape of an expanded olefinic thermoplastic elastomer product available from extrusion. Such expanded olefinic thermoplastic elastomer products therefore include sheets, plates, bars, pipes, tubes, circular cylinders, oval cylinders, strands, filaments, nets, profile extrusion products, multilayer extrusion products, and wire coatings.

No particular limitation is imposed on the expansion ratio of the expanded olefinic thermoplastic elastomer product available from the present invention. However, high-density expanded products having expansion ratios of from 1 to 4 times as well as low-density expanded products having expansion ratios of from 4 to 50 times are suited for actual applications or in industrial production.

Referring to FIG. 1, a description will next be made about the process according to the first embodiment of the present invention for the production of an expanded product by injection molding. To a resin-plasticating cylinder 1 equipped with a line through which a blowing agent is added to a molten olefinic thermoplastic elastomer, an injector 2 equipped with an injection plunger 11 is connected via an on-off valve 10. The olefinic thermoplastic elastomer is fed into the resin-plasticating cylinder 1 and, while heating and melting the elastomer, carbon dioxide is added, whereby a molten olefinic thermoplastic elastomer composition is formed in a mutually-dissolved state.

The molten olefinic thermoplastic elastomer composition is then transferred to the injector 2 equipped with the injection plunger 11. Subsequent to the transfer, the on-off valve 10 is closed so that the resin-plasticating cylinder 1 and the injector 2 are isolated from each other. The resin-plasticating cylinder 2 continuously forms the molten olefinic thermoplastic elastomer composition without interruption even while the injector 2 is performing the metering and injection step. Since the molten olefinic thermoplastic elastomer composition is not metered to the injector 2, the pressure within the resin-plasticating cylinder 1 arises. Because the mutuallydissolved state of the molten olefinic thermoplastic elastomer composition is not destroyed by the pressure rise, no problems arise by the continuation of the gas dissolving step and the cooling step. If any problem is however expected to arise in view of the with-standable pressure of the resin-plasticating cylinder 1, the apparatus can be modified without departing from the principle of the present invention in such a way that the molten olefinic thermoplastic elastomer composition can be discharged out of the system by operating the on-off valve 10.

On the other hand, the injector 2 performs injection after completion of the metering. In conventional injection molding machines, a back-pressure is once eliminated after the completion of the metering. In the present invention, however, a back-pressure is always kept applied from the beginning of metering until the end of the metering to avoid separation of the blowing agent and the olefinic thermoplastic elastomer from each other. The back-pressure at this time may be at least a pressure at which the blowing agent and the olefinic thermoplastic elastomer are prevented from separation, but anyhow, is required to be equal to or higher than the critical pressure of the blowing agent.

The molten olefinic thermoplastic elastomer composition formed in the resin-plasticating cylinder 1 is injected into a mold 3 without phase separation between the blowing agent and the olefinic thermoplastic elastomer.

Within the mold 3, the expansion controlling step is conducted by removing a high-pressure gas which has been filled in the mold 3 subsequent to the injection of the molten olefinic thermoplastic elastomer composition and/or by causing a portion or the entire portion of a core of the mold 3 to move backward.

Figure 2:
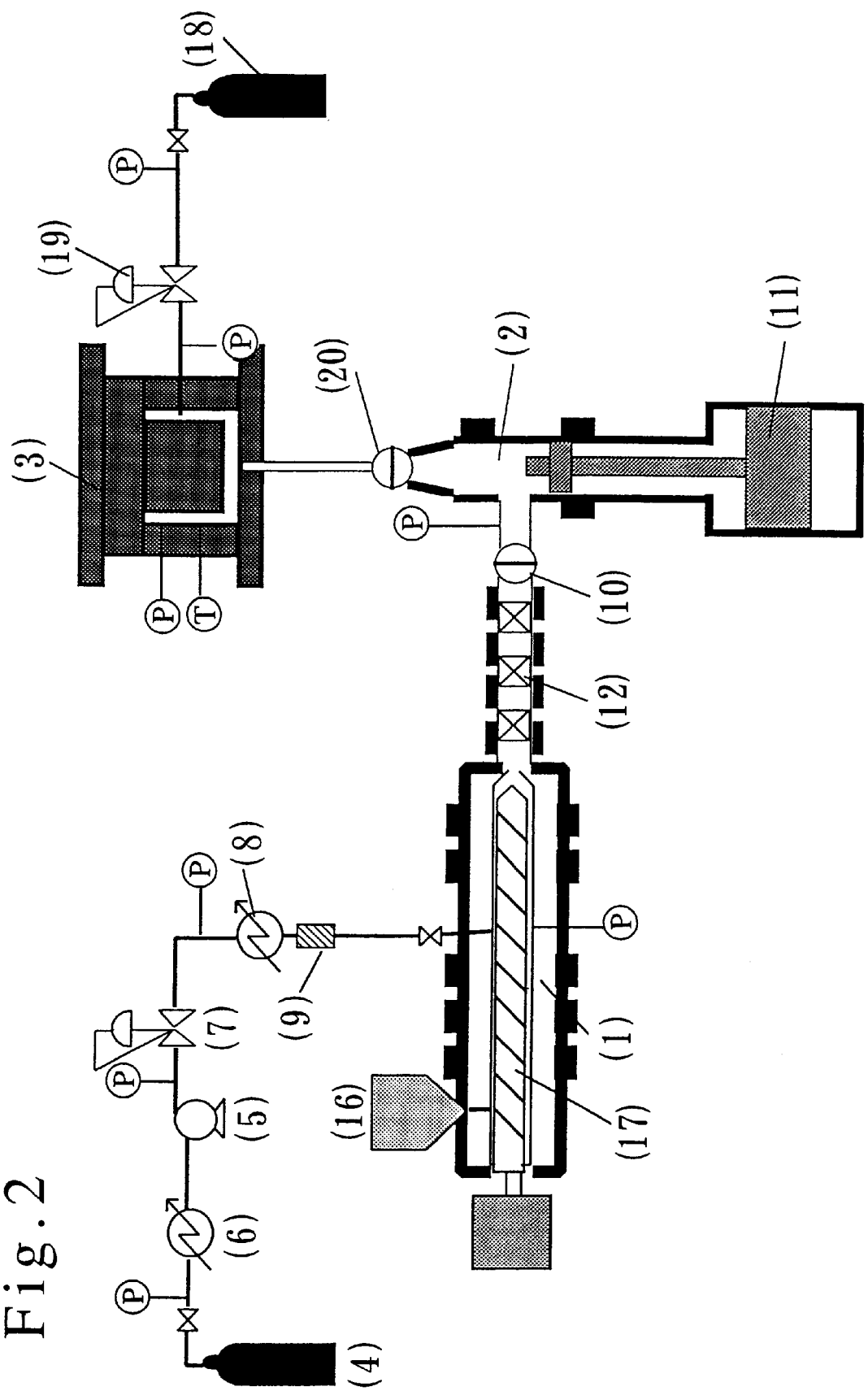
FIG. 2 is a schematic construction diagram illustrating a process according to a second embodiment of the present invention for the production of an expanded olefinic thermoplastic elastomer product.

The second embodiment of the present invention, which makes use of injection molding, is shown in FIG. 2. Between the resin-plasticating cylinder 1, which is equipped with the line through which a blowing agent is added to a molten olefinic thermoplastic elastomer, and the injector 2 equipped with the injection plunger 11, an adapter 12 having a mixing portion is arranged so that the adapter 12 is connected to the delivery line of the resin-plasticating cylinder 1, said delivery line being connected to the injector 2 via the on-off valve 10. The arrangement of the adapter 12 can further promote the mixing between the molten thermoplastic elastomer and the carbon dioxide to facilitate the formation of the olefinic thermoplastic elastomer and the carbon dioxide into a mutually-dissolved state. Further, temperature control by the adapter 12 can facilitate to cool the molten olefinic thermoplastic elastomer composition such that the composition has a viscosity suited for the subsequent injection and expansion. No particular limitation is imposed on the adapter 12 having the mixing portion, but an adapter 12 with a built-in static mixer can be suitably employed because it can perform kneading and cooling of the molten olefinic thermoplastic elastomer composition.

Figure 3:
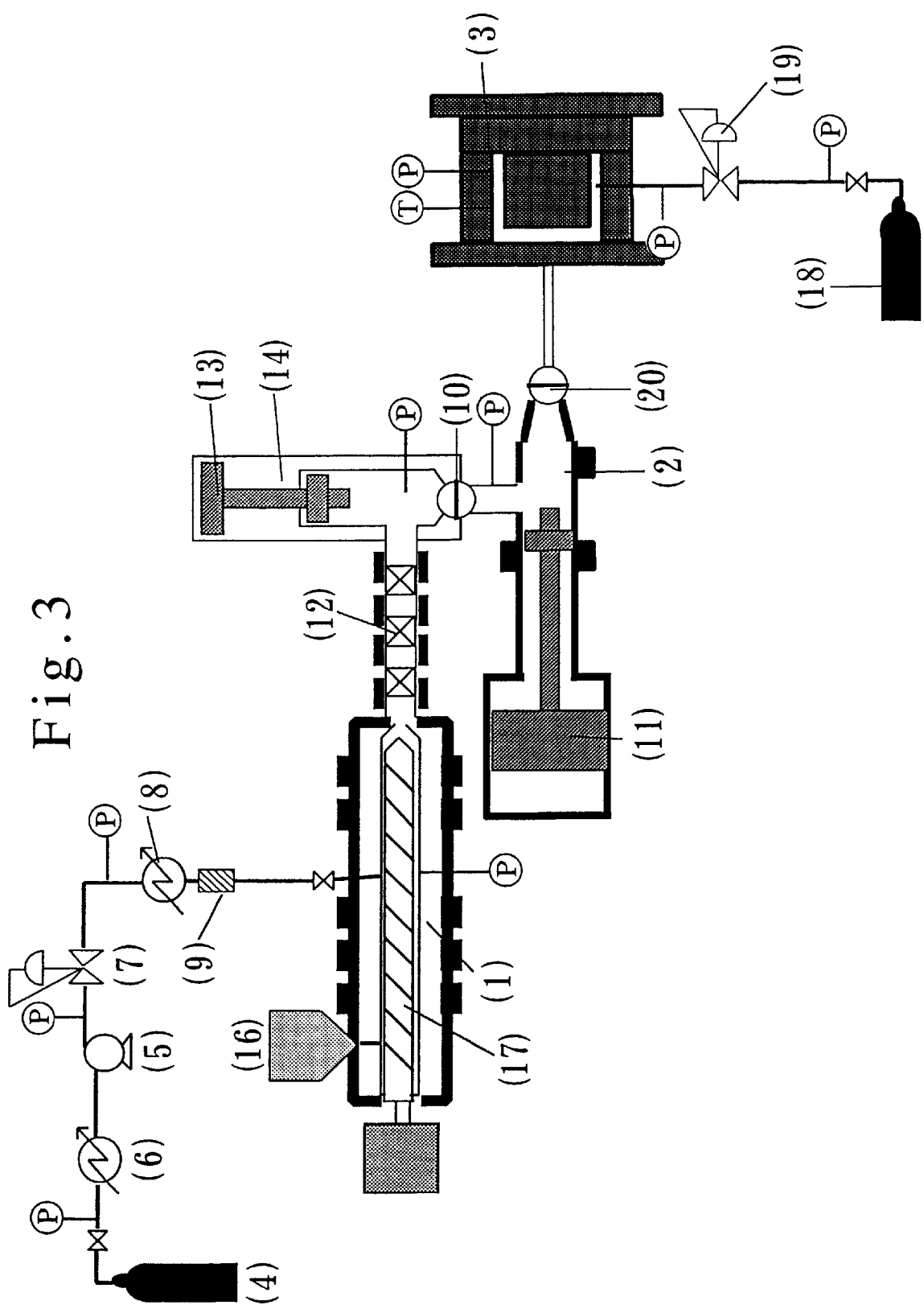
FIG. 3 is a schematic construction diagram illustrating a process according to a third embodiment of the present invention for the production of an expanded olefinic thermoplastic elastomer product.

The third embodiment of the present invention is illustrated in FIG. 3. Before the injector 2 equipped with the injection plunger 11, a resin accumulator 14 equipped with a resin accumulator plunger 13 is arranged so that the resin accumulator 14 is connected to the injector 2 via the on-off valve 10. After the on-off valve 10 has been turned off subsequent to completion of metering and while injection into the mold 3 is being performed by the injection plunger 11, the molten olefinic thermoplastic elastomer composition fed from the resin-plasticating cylinder 1 is fed to the resin accumulator 14 arranged immediately before the on-off valve 10. Owing to the flow-in of the molten olefinic thermoplastic elastomer composition, the plunger of the resin accumulator 14 is caused to move backwards. This control by the resin accumulator 14 makes it easier to maintain the interior of the apparatus system under a predetermined pressure. This in turn facilitates the maintenance of the molten olefinic thermoplastic elastomer composition in a mutually-dissolved state, thereby making it easier to form an expanded product with a good surface. The arrangement of the resin accumulator 14 is therefore preferred.

Figure 4:
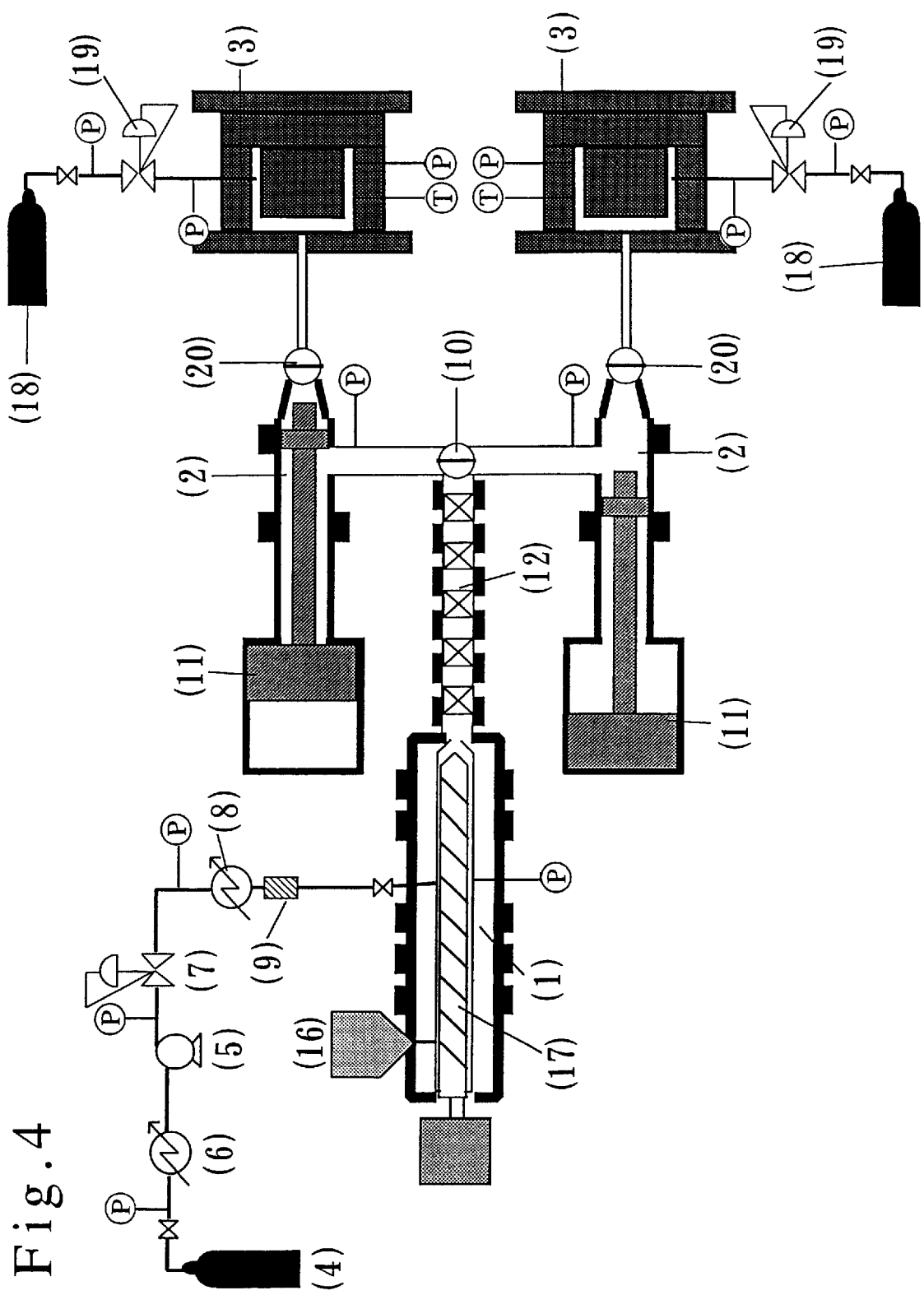
FIG. 4 is a schematic construction diagram illustrating a process according to a fourth embodiment of the present invention for the production of an expanded olefinic thermoplastic elastomer product.

The fourth embodiment of the present invention, which involves injection molding, is shown in FIG. 4. It is also possible to arrange one more injector 2, which is also equipped with an injection plunger 11, in place of the resin accumulator 14 equipped with the plunger. This makes it easier to maintain the interior of the apparatus system under a predetermined pressure. This in turn facilitates the maintenance of the molten olefinic thermoplastic elastomer composition in a mutually-dissolved state, thereby making it easier to form an expanded product with a good surface. The arrangement of the additional injector 2 equipped with the injection plunger 11 is therefore preferred.

Figure 5:
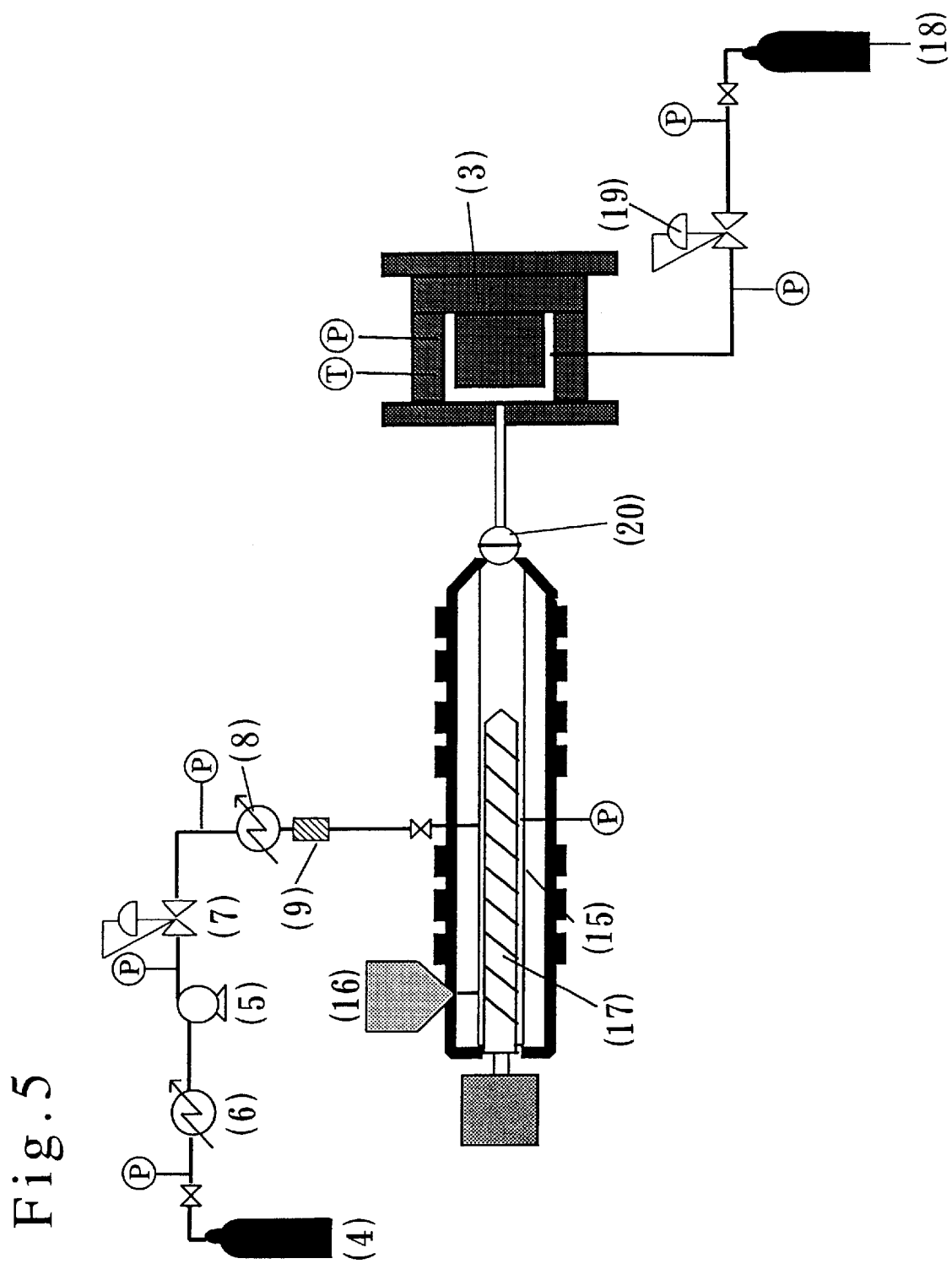
FIG. 5 is a schematic construction diagram illustrating a process according to a fifth embodiment of the present invention for the production of an expanded olefinic thermoplastic elastomer product.

In the case of the injection molding machines shown in FIGS. 1 to 4 and composed of the resin-plasticating cylinders 1 and the injectors 2 isolated from each other, the internal pressure of the system can be easily maintained such that the olefinic thermoplastic elastomer and the blowing agent are prevented from separation from each other. The production of expanded thermoplastic elastomer products, which is an object of the present invention, can be achieved with ease. However, an injection molding machine 15 of the in-line injection type such as that depicted in FIG. 5 can equally produce expanded olefinic thermoplastic elastomer products as in the present invention provided that the injection molding machine can keep a back-pressure applied through the gas dissolving step, the cooling step and the metering and injection step.

The gas dissolving step in the present invention, in which the mutually-dissolved state of the olefinic thermoplastic elastomer and carbon dioxide is formed, means a step in which, in the process according to the first embodiment of the present invention shown in FIG. 1 for the production of the expanded olefinic thermoplastic elastomer product, the olefinic thermoplastic elastomer is heated and molten in the resin-plasticating cylinder 1, carbon dioxide is added to the resulting molten olefinic thermoplastic elastomer, and they are then mixed into a uniform composition.

The cooling step is a step in which the molten olefinic thermoplastic elastomer composition is cooled such that its viscosity is adjusted to a level suited for injection and expansion.

The gas dissolving step and the cooling step are conducted in the resin-plasticating cylinder 1 and the adapter 12 in the illustrative process shown in FIG. 2 for the production of the expanded olefinic thermoplastic elastomer product. Further, in the illustrative process depicted in FIG. 3 for the production of the expanded olefinic thermoplastic elastomer product, they are conducted in the resin-plasticating cylinder 1, the adapter 12 and the resin accumulator 14.

The metering and injection step is a step in which the molten olefinic thermoplastic elastomer composition, the temperature of which has been controlled to give a viscosity suited for injection and expansion, is metered to the injector 2 and is then injected by the injection plunger 11. The expansion controlling step is a step in which the molten olefinic thermoplastic elastomer composition, which has been injected into the mold 3, is depressurized from a pressurized state to form cell nuclei and hence to control the expansion ratio.

Of these steps, at least the gas dissolving step and the cooling step are conducted following the methods disclosed in Japanese Patent Laid-Open No. 11190/1996 as will be described below.

An olefinic thermoplastic elastomer is fed from a hopper 16 into the resin-plasticating cylinder 1 and is molten at a temperature equal to or higher than the melting point or plasticizing temperature of the olefinic thermoplastic elastomer. As the temperature at this time, the thermoplastic resin is heated and molten at 100 to 300° C. On the other hand, carbon dioxide is charged from the liquefied carbon dioxide cylinder 4 into the predetermined amount deliverable pump 5, where the carbon dioxide is compressed, and the pressure-controlled carbon dioxide is then added into the molten olefinic thermoplastic elastomer in the resin-plasticating cylinder 1. At this time, the interior of the system may be maintained preferably above the critical pressure and critical temperature of the carbon dioxide contained in the resin-plasticating cylinder 1 so that the dissolution and diffusion of the carbon dioxide into the molten olefinic thermoplastic elastomer are substantially increased to permit its penetration into the molten olefinic thermoplastic elastomer in a short time.

Further, it is also preferred to raise the temperature and pressure of carbon dioxide before its addition to the molten olefinic thermoplastic elastomer in the resin-plasticating cylinder 1, and to add the same after it is brought into a supercritical state.

In the resin-plasticating cylinder 1, the molten olefinic thermoplastic elastomer and the carbon dioxide are kneaded by a screw 17 such that the olefinic thermoplastic elastomer and the carbon dioxide are formed into a mutually-dissolved state. After the mutual dissolution, the cooling step is conducted. By controlling the temperature of a free end portion of the resin-plasticating cylinder 1, the molten olefinic thermoplastic elastomer composition is cooled to a temperature which is equal to or higher than the plasticizing temperature of the molten olefinic thermoplastic elastomer composition, is higher by 50° C. or less than the plasticizing temperature of the molten olefinic thermoplastic elastomer composition and is equal to or lower than the melting temperature in the above-described gas dissolving step. As the temperature at this time, the molten olefinic thermoplastic elastomer composition is cooled to a temperature which is in a range of from 50 to 250° C., preferably from 80 to 240° C. and is equal to or higher than the plasticizing temperature of the molten olefinic thermoplastic elastomer composition so that the viscosity of the elastomer composition is adjusted to a level suited for subsequent injection and expansion.

The first to fifth embodiments of the present invention will hereinafter be described with reference to FIGS. 1 through 5, in which there are shown the resin-plasticating cylinder 1, the injector 2, the mold 3, the liquefied carbon dioxide cylinder 4, the predetermined amount deliverable pump 5, the on-off valve 10, the injection plunger 11, the adapter 12, the resin accumulator plunger 13, the resin accumulator 14, the in-line injection molding machine 15, the hopper 16, the screw 17, a gas cylinder 18, a pressure control valve 19, and an on-off valve 20.

In the case of carbon dioxide, the critical pressure and critical temperature are 7.4 MPa and 31° C. Inside the resin-plasticating cylinder 1, the pressure can be in a range of from 7.4 to 40 MPa, preferably from 10 to 30 MPa and the temperature can be in a range of from 100 to 300° C., preferably from 110 to 280° C.

Further, it is preferred to raise the temperature and pressure of carbon dioxide, as a blowing agent, before its addition to the molten olefinic thermoplastic elastomer in the resin-plasticating cylinder 1 and, to add the same after it is brought into a supercritical state.

In the resin-plasticating cylinder 1, the molten olefinic thermoplastic elastomer and the carbon dioxide are kneaded by the screw 17 such that the olefinic thermoplastic elastomer and the carbon dioxide are formed into a mutually-dissolved state. After the mutual dissolution, the cooling step is conducted. By controlling the temperature of the free end portion of the resin-plasticating cylinder 1, the molten olefinic thermoplastic elastomer composition is cooled to a temperature which is in a range of from 50 to 250° C., preferably from 80 to 240° C. and is equal to or higher than the plasticizing temperature of the molten olefinic thermoplastic elastomer composition so that the viscosity of the elastomer composition is adjusted to a level suited for the subsequent injection and expansion.

In the metering and injection step, the molten olefinic thermoplastic elastomer composition, the temperature of which has been controlled to have a viscosity suited for injection and expansion, is fed to the injector 2 connected via the on-off valve 10 and equipped with the injection plunger 11. When the on-off valve 10 is open, the molten olefinic thermoplastic elastomer composition flows into the injector 2 to cause the injection plunger 11 to move backward so that metering is effected.

In a conventional injection molding machine, a back-pressure becomes no longer applied immediately after the completion of the metering irrespective of its type such as the in-line screw type or the plunger type. In the present invention, it is however necessary to continue the application of a back-pressure and the control of the internal pressure of the system until the end of injection so that the molten olefinic thermoplastic elastomer composition is prevented from separation into the blowing agent and the thermoplastic elastomer and also from expansion within the injector 2 during this time.

The back-pressure during this time may preferably be equal to or higher than the critical pressure of carbon dioxide, although the back-pressure may be sufficient if it can maintain a minimum pressure for preventing the molten olefinic thermoplastic elastomer composition from separation into the blowing agent and the olefinic thermoplastic elastomer and also from expansion. Until the series of steps, that is, the gas dissolving step, the cooling step and the metering and injection step are completed, it is necessary to always maintain a pressure such that the molten olefinic thermoplastic elastomer composition is prevented from separating into the olefinic thermoplastic elastomer and the gas.

After the completion of the metering, the on-off valve 10 is turned off and injection into the mold 3 is then conducted by the injection plunger 11. By sucking back the injection plunger 11 prior to performing the injection subsequent to the metering, the internal pressure of the injector 2 can be slightly lowered to induce the formation of cell nuclei. This method can also be employed suitably.

Into the mold 3 shortly before the injection, a high-pressure gas which has been fed from the gas cylinder 18 or a predetermined amount deliverable pump 5 via the pressure control valve 19 is filled to a predetermined pressure. For example, when nitrogen is used as a high-pressure gas, its pressure can preferably be equal to or higher than the critical pressure of carbon dioxide employed as a blowing agent.

The advance filling of the mold 3 with the high-pressure gas assures expansion-free filling of the mold 3 with the molten olefinic thermoplastic elastomer composition injected into the mold, thereby providing the resulting expanded product with a good surface appearance.

In the expansion controlling step, the molten olefinic thermoplastic elastomer composition which is composed of the olefinic thermoplastic elastomer and the carbon dioxide in the mutually-dissolved state is injected into the mold 3 filled with the high-pressure gas. After the injection, the high-pressure gas filled in the mold 3 is rapidly released so that an abrupt pressure drop takes place inside the mold 3. By this step, the gas with which the olefinic thermoplastic elastomer is impregnated is brought into an over-saturated state, whereby numerous cell nuclei are formed.

As a method for developing an abrupt pressure drop inside the mold 3, there is also a suitably usable method in which the molten olefinic thermoplastic elastomer composition which is composed of the olefinic thermoplastic elastomer and the carbon dioxide in the mutually-dissolved state is injected into the mold 3, a portion or the entire portion of a core is caused to move backward, and the internal capacity of the mold 3 is hence abruptly increased to develop an abrupt pressure drop within the mold 3.

The expansion ratio can be controlled by the temperature of the mold 3, the internal pressure of the mold 3 and the backward stroke of the core inside the mold 3. An expanded olefinic thermoplastic elastomer product of a desired expansion ratio can therefore be obtained.

Sufficient expansion controlling effect can be obtained by using any one of these control methods for expansion, but there exists no problem if one uses two of these control methods in combination.

As is shown in FIG. 2, the adapter 12 having the mixing portion is arranged between the resin-plasticating cylinder 1, which is equipped with the line through which the blowing agent is added to the molten olefinic thermoplastic elastomer, and the injector 2, which is equipped with the injection plunger 11, so that the adapter 12 is connected to the delivery line of the resin-plasticating cylinder 1, said delivery line being connected to the injector 2 via the on-off valve 10. The arrangement of the adapter 12 can further promote the mixing between the molten olefinic thermoplastic elastomer and the carbon dioxide to facilitate the formation of the olefinic thermoplastic elastomer resin and the carbon dioxide into a mutually-dissolved state. Further, temperature control by the adapter 12 can facilitate to cool the molten olefinic thermoplastic elastomer composition such that the elastomer composition has a viscosity suited for the subsequent injection and expansion and the gas dissolving step and the cooling step can be conducted with ease. The above-described arrangement of the adapter 12 is therefore preferred. No particular limitation is imposed on the adapter 12 having the mixing portion, but an adapter with a built-in static mixer can be suitably employed because kneading and cooling of the molten olefinic thermoplastic elastomer composition can be effected.

As is illustrated in FIG. 3, the resin accumulator 14 equipped with the plunger is arranged before the injector 2 equipped with the injection plunger 11, so that the resin accumulator 14 is connected to the injector 2 via the on-off valve 10. After the on-off valve 10 has been turned off subsequent to completion of metering and while injection into the mold 3 is being performed by the injection plunger 11, the molten olefinic thermoplastic elastomer composition fed from the resin-plasticating cylinder 1 is fed to the resin accumulator 14 arranged immediately before the on-off valve 10. Owing to the flow-in of the molten olefinic thermoplastic elastomer composition, the plunger of the resin accumulator 14 is caused to move backward. This control of the resin accumulator 14 makes it easier to maintain the interior of the apparatus system under a predetermined pressure. This in turn facilitates the maintenance of the molten olefinic thermoplastic elastomer composition in a mutually-dissolved state, thereby providing an expanded product with a good surface appearance. The above-described arrangement of the resin accumulator 14 is therefore preferred.

As is depicted in FIG. 4, it is possible to arrange the additional injector 2, which is also equipped with the injection plunger 11, in place of the resin accumulator 14 equipped with the plunger (FIG. 3). This makes it easier to maintain the interior of the apparatus system under a predetermined pressure. This in turn facilitates the maintenance of the molten olefinic thermoplastic elastomer composition in a mutually-dissolved state, thereby providing an expanded product with a good surface appearance. This arrangement of the additional injector 2 equipped with the injection plunger 11 is therefore preferred.

In the case of the injection molding machines shown in FIGS. 1 to 4 and composed of the resin-plasticating cylinders 1 and the injectors 2 isolated from each other, the internal pressure of the system can be easily maintained such that the olefinic thermoplastic elastomer and the blowing agent are prevented from separation from each other. The production of expanded olefinic thermoplastic elastomer products, which is an object of the present invention, can be achieved with ease. However, an injection molding machine of the in-line injection type such as that (15) depicted in FIG. 5 can equally produce expanded olefinic thermoplastic elastomer products as in the present invention provided that the injection molding machine can keep a back-pressure applied through the gas dissolving step, the cooling step and the metering and injection step.

Further, according to the process of the present invention for the production of an expanded olefinic thermoplastic elastomer product by injection molding, a predetermined amount of carbon dioxide, as a blowing agent, can be added stably at a constant rate to a molten olefinic thermoplastic elastomer. Carbon dioxide is therefore added to the molten olefinic thermoplastic elastomer within the resin-plasticating cylinder 1, the carbon dioxide and the molten olefinic thermoplastic elastomer are thoroughly kneaded, and the resulting molten olefinic thermoplastic elastomer composition is then metered and injected into the injector 2. During these steps a back-pressure is kept applied, so that the formation of the molten olefinic thermoplastic elastomer composition into a mutually-dissolved state and the retention of the mutually-dissolved state of the molten olefinic thermoplastic elastomer composition are facilitated. Each expanded product is therefore provided with a good surface appearance. It is therefore possible to produce expanded olefinic thermoplastic elastomer products, which may range from highdensity expanded products to low-density expanded products, with uniform quality.

The present invention can also produce an expanded olefinic thermoplastic elastomer laminate, which is composed of an olefinic thermoplastic elastomer and a thermoplastic resin structural member laminated together.

The term "thermoplastic resin structural member" as used herein means all molded or otherwise formed products available by known resin molding or otherwise forming processes such as injection molding, extrusion, blow molding, press molding, rotoforming and injection compression molding, and embraces therein expanded products, fiber-reinforced expanded products, long fiber laminates, non-expanded injection-molded products, non-expanded extruded products, and the like.

A description will hereinafter be made of an illustrative process for the production of an expanded olefinic thermoplastic elastomer laminate.

Before a molten olefinic thermoplastic elastomer composition is injected into the mold 3, the mold is opened to arrange a structural member of thermoplastic resin within the cavity of the mold 3. After the arrangement, the mold 3 is closed and, if necessary, is filled with high-pressure gas. Following the above-described process of the present invention for the production of an expanded olefinic thermoplastic elastomer product, the expanded olefinic thermoplastic elastomer product is laminated with the structural member of thermoplastic resin to produce an expanded olefinic thermoplastic elastomer laminate.

As an alternative to the process which involves opening and closing of the mold 3 to arrange the structural member of thermoplastic resin within the cavity of the mold 3, an expanded olefinic thermoplastic elastomer laminate can also be produced by forming a structural member of thermoplastic resin in the mold 3 by a double-injection molding machine or the like and then laminating an expanded olefinic thermoplastic elastomer product with the structural member of thermoplastic resin in accordance with the above-described process of the present invention for the production of the expanded olefinic thermoplastic elastomer product. This alternative process is also used suitably.

The sixth embodiment of the present invention, which makes use of extrusion, will hereinafter be described with reference to FIG. 6, in which there are depicted the liquefied carbon dioxide cylinder 4, the predetermined amount deliverable pump 5, a cooling medium circulator 6, the pressure control valve 7, a heater 8, a flowmeter 9, a first extruder 21, a second extruder 22, a connecting member 23, a die 24, an expanded product 25, a hopper 26, a screw 27, and a cooling tunnel 28.

In the first extruder 21 which makes up an inlet side of a continuous plasticator and is equipped with a line through which a blowing agent is added to a molten olefinic thermoplastic elastomer, an olefinic thermoplastic elastomer is charged and, while heating and melting the olefinic thermoplastic elastomer, carbon dioxide is added to form a molten olefinic thermoplastic elastomer composition in which the olefinic thermoplastic elastomer and the blowing agent are in a mutually-dissolved state.

As an illustrative method for adding the blowing agent into the molten olefinic thermoplastic elastomer in the continuous plasticator, carbon dioxide in a gaseous form may be charged either as is or in a pressurized state, or carbon dioxide in a liquefied form may be added by a plunger pump or the like. Specifically, carbon dioxide is charged into the predetermined amount deliverable pump 5 from the liquefied carbon dioxide cylinder 4 or the like while the carbon dioxide is allowed to remain in a liquefied state. After the carbon dioxide is delivered with the delivery pressure of the predetermined amount deliverable pump 5 controlled constant within a range of from the critical pressure (7.4 MPa) of carbon dioxide to 40 MPa, the carbon dioxide is heated to the critical temperature (31° C.) of carbon dioxide or higher to convert the carbon dioxide into supercritical carbon dioxide. This supercritical carbon dioxide is then added to the molten olefinic thermoplastic elastomer. This method can be suitably employed.

The molten olefinic thermoplastic elastomer composition is then transferred to the second extruder 22 which makes up an outlet side of the continuous plasticator, and its temperature is gradually lowered to a level optimal for expansion. At this time, the pressure and temperature up to a free end portion of the second extruder 22 should preferably be equal to or higher than the critical pressure and temperature of carbon dioxide so that the carbon dioxide is allowed to remain in a supercritical state there.

Preferably, the connecting member 23 between the first extruder 21 and the second extruder 22 is provided with an adapter having a mixing portion. This further promotes the mixing of the molten olefinic thermoplastic elastomer and carbon dioxide, thereby facilitating the formation of the olefinic thermoplastic elastomer and carbon dioxide into a mutually-dissolved state. Further, temperature control by the adapter makes it easier to cool the molten olefinic thermoplastic elastomer composition such that the elastomer composition has a viscosity suited for subsequent expansion.

No particular limitation is imposed on the type of the adapter having the mixing portion, but an adapter with a built-in static mixer can be suitably employed because the molten olefinic thermoplastic elastomer composition can be subjected to kneading and cooling there.

However, the continuous plasticator may not be needed to be in the form of a tandem expansion extruder making additional use of the second extruder 22 but may be composed of only one extruder, provided that in the first extruder 21, the molten olefinic thermoplastic elastomer composition can be sufficiently formed into a mutually-dissolved state and can also be cooled to the temperature optimal for expansion.

The molten olefinic thermoplastic elastomer composition is next transferred to the die 24 set at the temperature optimal for expansion and connected to the free end portion of the continuous plasticator, and is lowered in pressure to initiate expansion.

In the process of the present invention for producing an expanded olefinic thermoplastic elastomer product by extrusion, the gas dissolving step in which the mutually-dissolved state of the olefinic thermoplastic elastomer and carbon dioxide is formed means a step in which the olefinic thermoplastic elastomer is heated and molten in the first extruder 21 making up the inlet side of the continuous plasticator, carbon dioxide is added to the resulting molten olefinic thermoplastic elastomer, and they are then mixed into a uniform composition.

The cooling step is a step in which at the outlet side of the continuous plasticator, the molten olefinic thermoplastic elastomer composition is cooled such that its viscosity is adjusted to a level suited for expansion.

The cell nuclei forming step is a step in which in the die 24, the molten olefinic thermoplastic elastomer composition is depressurized to a pressure equal to or lower than the critical pressure of carbon dioxide to bring elastomer composition into a state supersaturated with carbon dioxide so that a number of cell nuclei are caused to occur in the molten olefinic thermoplastic elastomer composition brought in the supersaturated state.

The expansion controlling step is a step in which the expanded product 25 is rapidly cooled to a temperature equal to or below the crystallization temperature of the olefinic thermoplastic elastomer so that the growth of formed cells is controlled to achieve a desired expansion ratio.

Of these steps, at least the gas dissolving step and the cooling step can be conducted in accordance with the process described in the claims and the respective examples of Japanese Patent Laid-Open No. 11190/1996 as will be described below.

The olefinic thermoplastic elastomer is fed from the hopper 26 into the first extruder 21, which makes up the inlet side of the continuous plasticator, and is molten at a temperature equal to or higher than the plasticizing temperature of the olefinic thermoplastic elastomer. As the temperature at this time, the thermoplastic resin is heated and molten at 150 to 300° C. On the other hand, carbon dioxide is charged from the liquefied carbon dioxide cylinder 4 into the predetermined amount deliverable pump 5, where the carbon dioxide is compressed, and the pressure-controlled carbon dioxide is then added into the molten olefinic thermoplastic elastomer in the first extruder 21.

At this time, the interior of the system may be maintained preferably above the critical pressure and critical temperature of the carbon dioxide contained in the first extruder 21 so that the dissolution and diffusion of the carbon dioxide into the molten olefinic thermoplastic elastomer are substantially increased to permit its penetration into the molten olefinic thermoplastic elastomer in a short time.

Further, it is also preferred to raise the temperature and pressure of carbon dioxide before its addition into the first extruder 21, and to add the same after it is brought into a supercritical state.

In the first extruder 21, the molten olefinic thermoplastic elastomer and the carbon dioxide are kneaded by the screw 27 such that the olefinic thermoplastic elastomer and the carbon dioxide are formed into a mutually-dissolved state.

After the mutual dissolution, the cooling step is conducted. By controlling the temperature of a free end portion of the second extruder 22, the molten olefinic thermoplastic elastomer composition is cooled to a temperature which is higher than the plasticizing temperature of the molten olefinic thermoplastic elastomer composition, is higher by 50° C. or less than the plasticizing temperature of the molten olefinic thermoplastic elastomer composition and is equal to or lower than the melting temperature in the above-described gas dissolving step. As the temperature at this time, the molten olefinic thermoplastic elastomer composition is cooled to a temperature which is in a range of from 50 to 250° C., preferably from 80 to 230° C. and is equal to or higher than the plasticizing temperature of the molten olefinic thermoplastic elastomer composition so that the viscosity of the elastomer composition is adjusted to a level suited for subsequent expansion.

Figure 7:
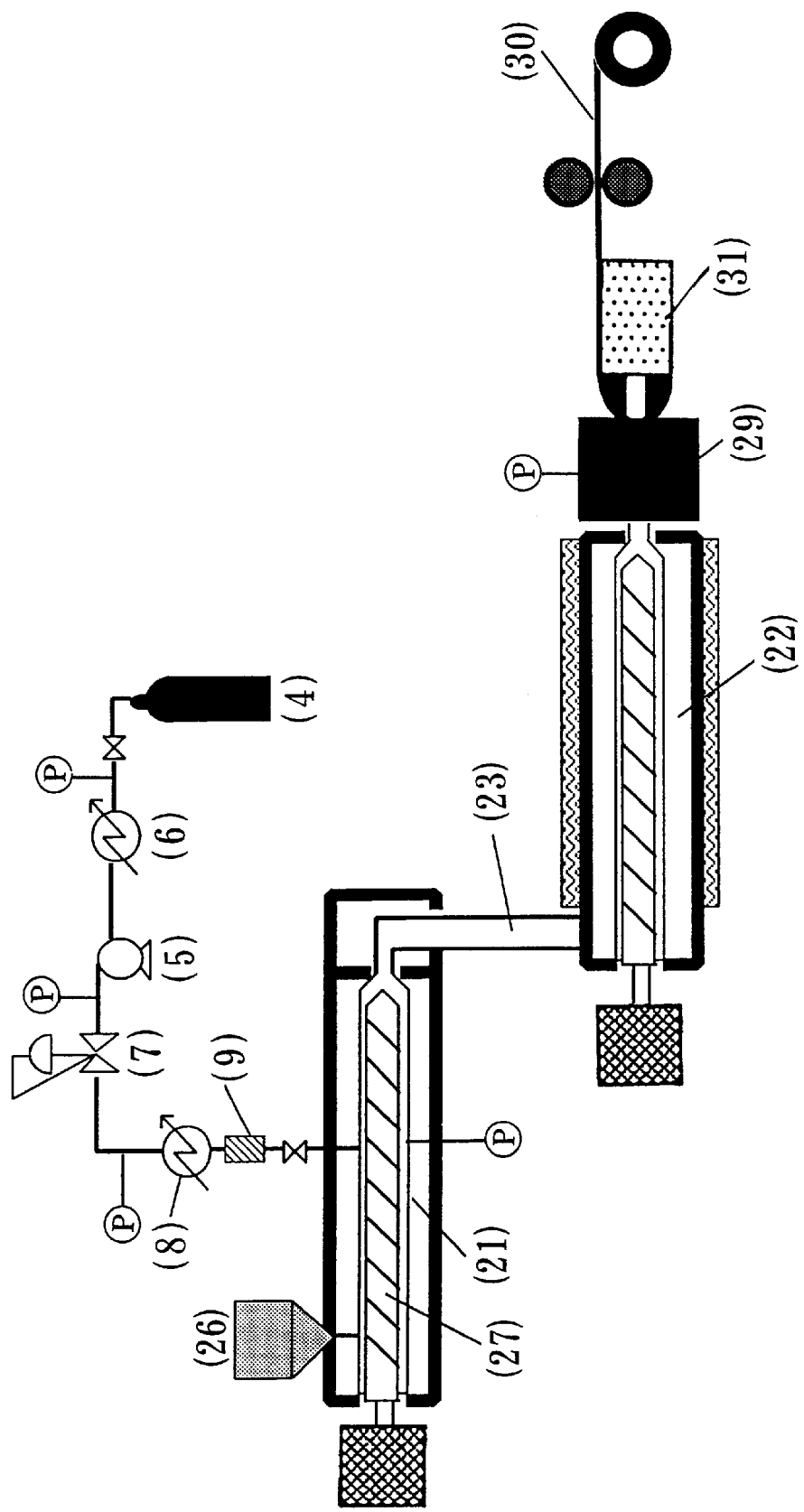
FIG. 7 is a shematic construction diagram illustrationg a process according to a seventh embodiment of the present invention for the production of an expanded olefinic thermoplastic elastomer product.

With reference to FIG. 7, a description will hereinafter be made about an illustrative process for continuously producing an expanded sheet by the process of the present invention for the production of an expanded olefinic thermoplastic elastomer product. In this embodiment, a circular die is used by way of example. It is however to be noted that use of a T-die such as a coathanger die or a fishtail die is en-compassed by the present invention.

In FIG. 7, there are shown the liquefied carbon dioxide cylinder 4, the predetermined amount deliverable pump 5, the cooling medium circulator 6, the pressure control valve 7, the heater 8, the flowmeter 9, the first extruder 21, the second extruder 22, the connecting member 23, the hopper 26, the screw 27, a circular die 29, an expanded sheet 30, and a water-cooled mandrel 31.

Reference is had to FIG. 7. In a gas dissolving step, 100 parts by weight of an olefinic thermoplastic elastomer are added through the hopper 26 into the first extruder 21 which makes up the inlet side of the continuous plasticator, and are then heated and molten. On the other hand, carbon dioxide is charged at a controlled temperature from the liquefied carbon dioxide cylinder 4 into the predetermined amount deliverable pump 5 and is pressurized. Then, 0.1 to 20 parts by weight of the pressure-controlled carbon dioxide are added to the molten olefinic thermoplastic elastomer composition in the first extruder 21 to perform the gas dissolving step. At this time, the interior of the system may be maintained preferably above the critical pressure and critical temperature of the carbon dioxide contained in the first extruder 21 so that the dissolution and diffusion of the carbon dioxide into the molten olefinic thermoplastic elastomer are substantially increased to permit its penetration into the molten olefinic thermoplastic elastomer in a short time.

In the case of carbon dioxide, the critical pressure is 7.4 MPa while the critical temperature is 31° C. Inside the first extruder 31, the pressure may be in a range of from 7.4 to 40 MPa, preferably from 10 to 30 MPa and the temperature may be in a range of from 150 to 300° C., preferably from 160 to 280° C.

Further, the carbon dioxide which is to be added to the molten olefinic thermoplastic elastomer in the first extruder 21 may be raised in temperature and pressure before its addition, and may be added after it is brought into a supercritical state.

In the first extruder 21, the molten olefinic thermoplastic elastomer and the carbon dioxide are kneaded by the screw 27 such that the olefinic thermoplastic elastomer and the carbon dioxide are formed into a mutually-dissolved state.

After the mutual dissolution, a cooling step is conducted. To increase the solubility of the carbon oxide in the olefinic thermoplastic elastomer, the molten olefinic thermoplastic elastomer composition is fed to the second extruder 22 which makes up the outlet side of the continuous plasticator, where the molten olefinic thermoplastic elastomer composition is cooled to a temperature suited for expansion.

As the temperature at this time, the molten olefinic thermoplastic elastomer composition is cooled while maintaining its temperature within a range of from 50 to 250° C., preferably from 80 to 230° C. and above its plasticizing temperature so that the viscosity of the elastomer composition is adjusted to a level suited for subsequent expansion.

The cooling step making use of the second extruder 22 is a step for bring the temperature of the molten olefinic thermoplastic elastomer composition close to a temperature condition suited for expansion. Thorough cooling in this step facilitates the continuous and stable production of an expanded olefinic thermoplastic elastomer product. It is however to be noted that, when an apparatus capable of sufficiently cooling the molten olefinic thermoplastic elastomer composition to a temperature suited for expansion is used, the connection of the second extruder 22 as the outlet side of the continuous plasticator is no longer needed and an expanded product can be produced by a single extruder.

To improve the state of dissolution of carbon dioxide in the molten olefinic thermoplastic elastomer composition, it is more preferred to connect a mixing portion such as a static mixer in the connecting member 23 between the first extruder 21 and the second extruder 22.

The molten olefinic thermoplastic elastomer composition is next transferred to the circular die 29, which is set at an optimal expansion temperature and is connected to the outlet side of the continuous plasticator, and is caused to initiate expansion. By lowering the pressure of the molten olefinic thermoplastic elastomer composition under controlled conditions at an outlet of the circular die 29, the elastomer composition is brought into a state oversaturated with carbon dioxide.

The molten olefinic thermoplastic elastomer composition, which has been brought into the oversaturated state, is in a thermally unstable state, so that a number of cells are formed therein. It is known that the glass transition temperature of a gas-containing resin generally drops in proportion to the amount of gas impregnated therein. Nonetheless, the internal temperature of the circular die 29 may preferably be equal to or higher than the glass transition temperature of the molten olefinic thermoplastic elastomer composition.

The molten olefinic thermoplastic elastomer composition, which has initiated expansion, is extruded through the outlet of the circular die 29.

The molten olefinic thermoplastic elastomer composition extruded from the circular die 29 initiates expansion concurrently with its delivery. By applying the delivered molten olefinic thermoplastic elastomer composition to the water-cooled mandrel 31 arranged after the circular die 29, the resulting expanded product is formed into a cylindrical shape. After this expanded cylindrical product advances under cooling on and along the water-cooled mandrel 31, it is cut by a cutter blade to obtain the expanded olefinic thermoplastic elastomer sheet 30.

In the present invention, it is necessary to prevent the molten olefinic thermoplastic elastomer composition from separating into the olefinic thermoplastic elastomer and carbon dioxide until the gas dissolving step and the cooling step are completed. For this purpose, it is desired to maintain a pressure of the critical pressure of carbon dioxide or higher.

According to the process of the present invention for producing an expanded olefinic thermoplastic elastomer product by extrusion, carbon dioxide is added to a molten olefinic thermoplastic elastomer in the first extruder 21 which makes up the inlet side of the continuous plasticator. Subsequent to thorough kneading, the olefinic thermoplastic elastomer and the carbon dioxide are formed into a mutually-dissolved state. At the outlet side of the continuous plasticator, the temperature of the molten olefinic thermoplastic elastomer composition is lowered such that the pressure is reduced to initiate expansion. The expansion ratio is then controlled by the water-cooled mandrel 31. It is therefore possible to continuously produce with uniform quality a variety of expanded olefinic thermoplastic elastomer products which range from expanded products having low expansion ratios of from about 1 to 4 times to expanded products having high expansion ratios of from about 4 to 50 times.

Concerning the process of the present invention for the production of expanded olefinic thermoplastic elastomer products, no particular limitation is imposed on the shapes of available products. Such expanded olefinic thermoplastic elastomer products can therefore include, for example, car parts or components such as instrument panel skins, door skins, expanded backings for instrument panel skins and door skins, door trims, pillars, console boxes, steering wheels, shift levers, air boxes, dash panels, replaceable seat cushions, differential gear garnishes, curl top garnishes, ceiling materials, weather strip sponges, trunk room linings, engine room linings, bumpers, fenders, hood surface layers, side shields, and cushions; motorcycle parts and components such as handlebar grips, helmet linings, seats, and surface layers for racing suits; parts and products for office automation (OA) equipments, such as mice, keyboards, and housings for OA equipments, mouse pads, desk mats; headphones; electronic calculators; telephone handsets; housings for PHS (personal handy-phone system), other mobile phones and the like; miscellaneous goods such as system pocketbooks, wallets, notebooks, document holders, bags, toilet seats, pencils, ballpoint pens, fountain pens, carpets, handles for kitchen knives, and grips for hedge shears or trimmers; footwear such as zori (Japanese sandals), geta (wooden clogs), slippers, shoe soles and sandals; electric parts such as wire coverings, connectors, caps, and plugs; construction materials such as cut-off boards, sealing sponges, and noise barrier walls; equipments for leisure time amusement, such as grips for golf clubs, grips for baseball bats, grips for tennis rackets, fins for skin diving, and swimming goggles; miscellaneous industrial items such as gaskets, waterproof sheets, garden hoses, drive belts, and industrial packings. These items can be produced with ease.

The present invention will hereinafter be described by Examples. It is however to be noted that the contents of the present invention shall not be limited to the Examples.

Figure 6:
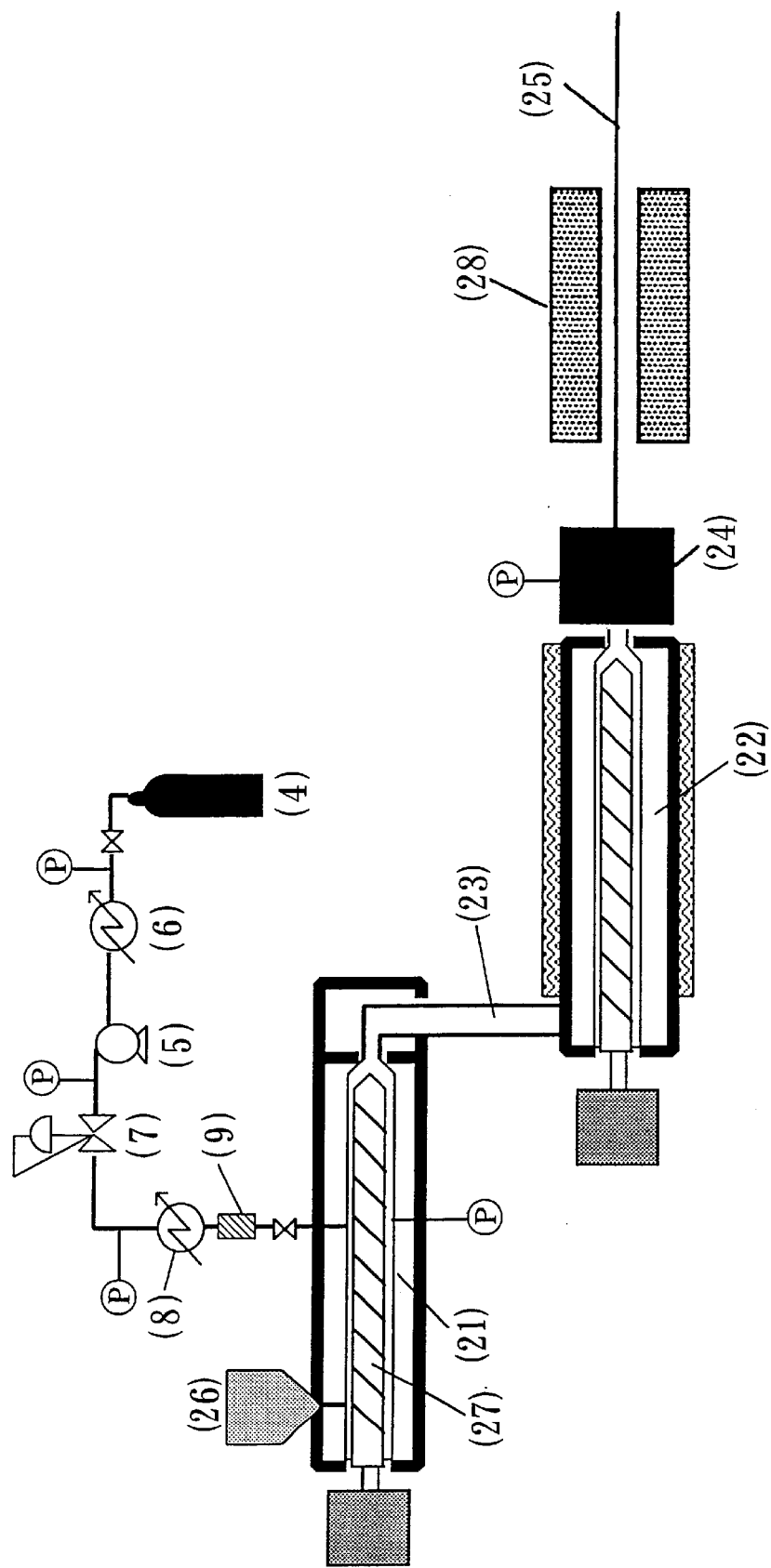
FIG. 6 is a schematic construction diagram illustrating a process according to a sixth embodiment of the present invention for the production of an expanded olefinic thermoplastic elastomer product.

FIGS. 1 to 5 are the schematic construction diagrams illustrating the processes according to the first to fifth embodiments of the present invention for the production of expanded olefinic thermoplastic elastomer products;

FIGS. 6 and 7 are the schematic construction diagrams illustrating continuous production of expanded sheets by the processes according to the sixth and seventh embodiments of present invention for the production of expanded olefinic thermoplastic elastomer products.

EXAMPLES

The evaluations of physical properties described in the Examples and Comparative Examples were conducted following the following methods, respectively.

1) Surface Appearance

When a surface of an expanded sheet was found to be smooth and uniform by visual observation, the expanded sheet was rated "A". When cells were observed on a surface of an expanded sheet due to cell collapse, the expanded sheet was rated "B". When a surface of an expanded sheet was extremely defective, for example, due to inclusion of a blister-like swell, the expanded product was rated "C". Those rated "A" were considered to be acceptable.

2) Expansion Ratio

An expanded olefinic thermoplastic elastomer sheet or product was continuously produced, and three samples were collected at 30-minute intervals. The samples so collected were cut into square shapes of 30 mm×30 mm, and their densities were measured using an electronic density meter. From the average of the measurement values of the three samples, the ratio of the density of the expanded sheet or product to the density of the raw material olefinic thermoplastic elastomer was calculated. A value rounded to one decimal was recorded as an expansion ratio.

3) Flexibility

A sample having sponge-like soft feeling to touch was rated "A", while a sample having hard feeling to touch like non-expanded resins was rated "C". Touch feeling between these two grades was rated "A$^-$", "B" and "B$^-$" depending on the softness. Those rated "A$^-$" or softer were considered to be acceptable.

4) Heat Resistance

Following JIS K7206, the heat resistance of each sample was measured under a testing load of 10 N. Sample having heat resistance of 100° C. or higher were rated "A", samples having heat resistance of 70° C. or higher but lower than 100° C. were rated "B", and samples having heat resistance lower than 70° C. were rated "C". Those rated "B" or higher were considered to be acceptable.

5) Average Cell Diameter

An expanded olefinic thermoplastic elastomer sheet or product was continuously produced, and three samples were collected at 30-minute intervals. Images of the sections of the three samples were taken by a scanning electron microscope.

The image of each section was separately subjected to image processing. With respect to cells located in a 500 $\mu$m square area, equivalent circle diameters were measured, followed by the calculation of an average equivalent circle diameter. An average of the average equivalent circle diameters of the three samples was recorded as an average cell diameter.

6) Uniformity of Cells

The uniformity of cells in an expanded sheet was rated "A" when with respect to each of three samples, the largest equivalent circle diameter in the image of its section, said image having been taken by the scanning electronmicroscope, was not greater than 1.5 times the average equivalent circle diameter thereof and the average equivalent circle diameter of the three samples was within ⅔ to 1.5 times the average cell diameter. Likewise, the uniformity of cells in an expanded sheet was rated "B" when the maximum equivalent circle diameter was not greater than 2 times the corresponding average equivalent circle diameter and the average equivalent circle diameter of the three samples was within ½ to 2 times the average cell diameter. Further, the uniformity of an expanded sheet having maximum equivalent circle diameters and an average equivalent circle diameter exceeding the ranges of "B", respectively, was rated "C". Those rated "B" or higher were considered to be acceptable.

7) Stability of Quality

When the surface appearance and cell uniformity of an expanded sheet were both rated "A" in the above-described evaluation, the stability of quality of the expanded sheet was rated "A". When they were both rated "B" or higher, the stability of quality of the expanded sheet was rated "B". When the surface appearance and cell uniformity did not fall in the above-described categories, the stability of quality of the expanded sheet was rated "C". Those rated "B" or higher were considered to be acceptable.

EXAMPLE 1

In this example, the apparatus illustrated in FIG. 1 was used. A carbon dioxide adding section was arranged around the center of the resin-plasticating cylinder 1. Forty (40) parts by weight of a mineral-oil-base softening agent ("DYNA PROCESS OIL PW-380", trade name; product of Idemitsu Kosan Co., Ltd.) were mixed with 100 parts by weight of an ethylenepropylene-5-ethylidene-2-norbornene copolymer the ethylene content, iodine value and Mooney viscosity [$ML_{1+4}$ (100° C.)] of which were 78 mole %, 13 and 140, whereby oil-extended EPDM pellets were obtained. Sixty (60) parts by weight of the oil-extended EPDM pellets, 25 parts by weight of propylene-ethylene block copolymer pellets the ethylene content and melt flow rate (ASTM D-1238-65T, 230° C., 2.16 kg load) of which were 8 wt. % and 10 g/10 minutes, and 15 parts by weight of ethylene-4-methyl-1-butene copolymer pellets the ethylene content and melt flow rate (ASTM D-1238-65T, 190° C., 2.16 kg load) of which were 97 wt. % and 10 g/10 minutes were mixed as olefinic thermoplastic elastomers with a liquid mixture of 0.2 part by weight of 1,3-bis(tert-butylperoxyisopropyl)benzene and 0.2 part by weight of divinylbenzene in a tumbling blender, whereby the liquid mixture was caused to evenly adhere to surfaces of the mixed pellets. The pellets were extruded at 230° C. by a twin-screw extruder ("TEM-50", trade name; manufactured by Toshiba Machine Co., Ltd.) to perform dynamic heat treatment. The thus-prepared crosslinked thermoplastic elastomer the gel content of which was 95 wt. % was used.

The feed material was added through the hopper 16 to the resin-plasticating cylinder 1, and was then heated and molten at 250° C.

A liquefied carbon dioxide cylinder 4 of the siphon type was used to permit supplying carbon dioxide directly from a liquid phase. Using the cooling medium circulator 6, the flow line from the liquefied carbon dioxide cylinder 4 to the plunger pump 5 was cooled with an aqueous ethylene glycol solution controlled at −12° C., thereby making it possible to charge carbon dioxide in a liquefied state into the plunger pump 5. The plunger pump 5 was then controlled such that the adding rate of the thus-charged liquefied carbon dioxide became 10 parts by weight per 100 parts by weight of the olefinic thermoplastic elastomer, and the delivery pressure of the plunger pump 5 was adjusted to 30 MPa by the pressure control valve 7. The line, which extended from the pressure control valve 7 to the carbon dioxide adding section of the resin-plasticating cylinder 1, was then heated by a heater 8 such that its temperature remained at 50° C., and carbon dioxide was added to the molten olefinic thermoplastic elastomer in the resin-plasticating cylinder 1. At that time, the pressure of the molten resin in the carbon dioxide adding section was 20 MPa. Namely, the carbon dioxide immediately before its dissolution in the molten olefinic thermoplastic elastomer was carbon dioxide in a supercritical state that its temperature was 50° C. or higher and its pressure was 20 MPa.

In the manner as described above, carbon dioxide was added to the fully molten olefinic thermoplastic elastomer. In the resin-plasticating cylinder 1, the carbon dioxide and the molten olefinic thermoplastic elastomer were kneaded and dissolved together. The molten olefinic thermoplastic elastomer composition was gradually cooled to 180° C., metered into the injector 2 set at 180° C., and then injected into the mold 3 set at 40° C. At that time, the mold 3 immediately before the injection has been filled with nitrogen gas under a pressure of 8 MPa. After completion of the injection, the nitrogen gas filled in the cavity 3 was released in 1 second and to adjust the expansion ratio to 2 times or so, the core of the mold 3 the dimensions of a cavity of which were 60×60×2 (thickness) mm was caused to move backward over 2 mm, whereby a flat plate (60 mm×60 mm×4 mm) was obtained as an expanded olefinic thermoplastic elastomer product.

Evaluation results of the expanded product are shown in Table 1. It was an expanded product excellent in flexibility, heat resistance and surface appearance.

EXAMPLE 2

Following the procedures of Example 1 except that 60 parts by weight of oil-extended EPDM, which had been obtained by blending 40 parts by weight of the mineral-oil-base softening agent ("DYNA PROCESS OIL PW-380", trade name; product of Idemitsu Kosan Co., Ltd.) with 100 parts by weight of an ethylenepropylene-5-ethylidene-2-norbornene copolymer the ethylene content, iodine value and Mooney viscosity [$ML_{1+4}$ (100° C.)] of which were 73 mole %, 13 and 140, 15 parts by weight of butyl rubber the unsaturation degree and Mooney viscosity [$ML_{1+4}$ (100° C.)] of which were 0.7 mole % and 56 and 15 parts by weight of a propylene-ethylene random copolymer the ethylene content and melt flow rate (ASTM D-1238-65T, 230° C., 2.16 kg load) of which were 3.2 wt. % and 10 g/10 minutes were kneaded with 10 parts by weight of the mineral-oil-base softening agent ("DYNA PROCESS OIL PW-380", trade name; product of Idemitsu Kosan Co., Ltd.) at 180° C. for 5 minutes in a nitrogen gas atmosphere by a Banbury mixer, the kneaded melt was caused to pass through a sheeting roll, the thus-obtained sheet was then chopped into pellets, 100 parts by weight of the pellets so obtained were mixed with a liquid mixture of 0.4 part by weight of 1,3-bis(tert-butylperoxyisopropyl)benzene and 0.5 parts by weight of divinylbenzene in a tumbling blender to cause the liquid mixture to evenly adhere to surfaces of the pellets, the pellets were extruded at 230° C. by a twins-crew extruder ("TEM-50", trade name; manufactured by Toshiba Machine Co., Ltd.) to perform dynamic heat treatment, and the thus-prepared crosslinked thermoplastic elastomer the gel content of which was 80 wt. % was used, an expanded product was obtained.

Evaluation results of the expanded product are shown in Table 1. It was an expanded product excellent in flexibility, heat resistance and surface appearance.

COMPARATIVE EXAMPLES 1–2

Following the procedures of Example 1 except that the proportions of the thermoplastic elastomer and carbon dioxide were changed as shown in Table 1, expanded products were obtained.

Evaluation results of the expanded products are shown in Table 1. They were not preferred for a poor surface appearance, expansion ratios different from desired ones, and the like.

COMPARATIVE EXAMPLE 3

Following the procedures of Example 1 except that azodicarbonamide was used as a blowing agent in place of carbon dioxide and the cylinder temperature was set at 200° C. to produce gas by decomposing the azodicarbonamide, an expanded product was obtained.

Evaluation results of the expanded product are shown in Table 1. The expanded product had non-uniform cell diameters and a poor surface appearance, and was not an expanded product intended by the present invention.

COMPARATIVE EXAMPLE 4

Following the procedures of Example 2 except that azodicarbonamide was used as a blowing agent in place of carbon dioxide and the cylinder temperature was set at 200° C. to produce gas by decomposing the azodicarbonamide, an expanded product was obtained.

Evaluation results of the expanded product are shown in Table 1. The expanded product had non-uniform cell diameters and a poor surface appearance, and was not an expanded product intended by the present invention.

EXAMPLE 3

Following the procedures of Example 1 except that the backward stroke of the core of the mold 3 was set at 4 mm and the preset expansion ratio was changed to about 3 times, a flat plate (60 mm×60 mm×6 mm) was obtained as an expanded olefinic thermoplastic elastomer product.

Evaluation results of the expanded product are shown in Table 1. It was an expanded product excellent in flexibility, heat resistance and surface appearance.

EXAMPLE 4

Following the procedures of Example 1 except that the backward stroke of the core of the mold 3 was set at 8 mm and the preset expansion ratio was changed to 5 times, a flat plate (60 mm×60 mm×10 mm) was obtained as an expanded olefinic thermoplastic elastomer product.

Evaluation results of the expanded product are shown in Table 1. It was an expanded product excellent in flexibility, heat resistance and surface appearance.

COMPARATIVE EXAMPLE 5

Following the procedures of Example 4 except that an ethylene-vinyl acetate copolymer, the melt flow rate (ASTM D-1238-65T, 190° C., 2.16 kg load) and vinyl acetate content of which were 30 g/10 minutes and 33 wt. %, was used in place of the olefinic thermoplastic elastomer and butane gas was used as a blowing agent, a flat plate (60 mm×60 mm×10 mm) was obtained as an expanded olefinic thermoplastic elastomer product.

Evaluation results of the expanded product are shown in Table 1. The expanded product was good in flexibility but poor in heat resistance. It was therefore not an expanded product intended by the present invention.

COMPARATIVE EXAMPLE 6

Following the procedures of Example 4 except that a propylene-ethylene block copolymer, an olefinic plastic (B), the melt flow rate (ASTM D-1238-65T, 230° C., 2.16 kg load) and ethylene content of which were 1.5 g/10 minutes and 5 wt. %, was used in place of the olefinic thermoplastic elastomer and butane gas was used as a blowing agent, a flat plate (60 mm×60 mm×10 mm) was obtained as an expanded olefinic thermoplastic elastomer product.

Evaluation results of the expanded product are shown in Table 1. The expanded product was good in heat resistance but poor in flexibility. It was therefore not an expanded product intended by the present invention.

EXAMPLES 5–7

Following the procedures of Example 1 except that in addition to the crosslinked thermoplastic elastomer, a propylene-ethylene block copolymer the melt flow rate (ASTM D-1238-65T, 230° C., 2.16 kg load) and ethylene content were 1.5 g/10 minutes and 5 wt. % was used as an olefin plastic (B) and the proportion of carbon dioxide was changed to the proportions shown in Table 2, expanded products were obtained.

Evaluation results of the expanded products are shown in Table 1. They were expanded products excellent in flexibility, heat resistance and surface appearance.

EXAMPLE 8

Following the procedures of Example 1 except that an unexpanded flat polypropylene resin plate of 1 mm in thickness was placed in the mold 3, an expanded laminate with an expanded olefinic thermoplastic elastomer product laminated with a polypropylene resin was obtained.

Evaluation results of the laminate are shown in Table 1. It was a laminate in which the expanded product and the flat polypropylene resin plate were firmly bonded together.

TABLE 1

|  | Example | | | | | | | | Comparative Example | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 | 6 |
| Thermoplastic elastomer (parts by weight) | 100 | 100 | 100 | 100 | 70 | 50 | 30 | 100 | 100 | 100 | 100 | 100 | — | — |
| Olefin plastic (parts by weight) | — | — | — | — | 30 | 50 | 70 | — | — | — | — | — | — | 100 |
| Ethylene-vinyl acetate copolymer (parts by weight) | — | — | — | — | — | — | — | — | — | — | — | — | 100 | — |
| Carbon dioxide (parts by weight) | 10 | 10 | 10 | 10 | 10 | 10 | 10 | 10 | 0.05 | 40 | — | — | — | — |
| Azodicarbonamide (parts by weight) | — | — | — | — | — | — | — | — | — | — | 2 | 2 | — | — |
| Butane gas (parts by weight) | — | — | — | — | — | — | — | — | — | — | — | — | 10 | 10 |
| Surface appearance | A | A | A | A | A | A | A | A | A | C | B | B | A | A |
| Expansion ratio | 2 | 2 | 5 | 2 | 2 | 2 | 2 | 2 | 1.2 | 3 | 2 | 2 | 5 | 5 |
| Flexibility | A⁻ | A⁻ | A | A⁻ | A⁻ | A⁻ | B | A⁻ | B⁻ | B | B | B | A | B⁻ |
| Heat resistance | A | A | A | A | A | A | A | A | A | A | A | A | C | A |
| Average cell diameter ($\mu$m) | 150 | 150 | 220 | 150 | 120 | 120 | 150 | 100 | 200 | 500 | 300 | 300 | 500 | 500 |
| Cell uniformity | A | A | A | A | A | A | A | A | C | C | C | C | B | A |
| Stability of quality | A | A | A | A | A | A | A | A | A | C | C | C | B | A |

COMPARATIVE EXAMPLE 7

An attempt was made to bond and integrate an expanded olefinic thermoplastic elastomer product of 60 mm×60 mm×4 mm (thickness) with an unexpanded planar polypropylene resin plate of the same shape as that used in Example 8. The process however became complex, because the integrations needed use of an adhesive or heating and melting of a surface of the flat polypropylene resin plate and the bonding required fixing by a press. Moreover, it was difficult to obtain laminates of desired dimensions with accuracy.

EXAMPLE 9

Following the procedures of Example 1 except that a mixture obtained by dry-blending 30 parts by weight of an ethylene-octene rubber ("ENGAGE 8100", trade name; product of Du Pont-Dow Elastomer Inc.), the melt flow rate (ASTM D-1238-65T, 190° C., 2.16 kg load) and octene content of which were 1 g/10 minutes and 24 wt. %, and 70 parts by weight of a propylene-ethylene block copolymer ("GRAND POLYPRO BJS-M", trade name; product of Grand Polymer Co., Ltd.), the melt flow rate (ASTM D-1238-65T, 230° C., 2.16 kg load) and ethylene content of which were 1.5 g/10 minutes and 5 wt. %, was used as a thermoplastic elastomer (A), a flat plate (60 mm×60 mm×4 mm) was obtained as an expanded olefinic thermoplastic elastomer product.

Evaluation results of the expanded product are shown in Table 2. It was an expanded product excellent in flexibility, heat resistance and surface appearance.

EXAMPLES 10–14

Following the procedures of Example 9 except that the ethylene-octene rubber, the propylene-ethylene block copolymer and carbon dioxide were used in the proportions shown in Table 2, flat plates (60 mm×60 mm×4 mm) were obtained as expanded olefinic thermoplastic elastomer products.

Evaluation results of the expanded products are shown in Table 2. They were expanded products excellent in flexibility, heat resistance and surface appearance.

EXAMPLE 15

Following the procedures of Example 9 except that the propylene-ethylene block copolymer employed as an olefin plastic (B) was replaced by propylene homopolymer ("GRAND POLYPRO JS-M", trade name; product of Grand Polymer Co., Ltd.) the melt flow rate (ASTM D1238-65T, 230° C., 2.16 kg load) was 1.5 g/10 minutes, an expanded product was obtained.

Evaluation results of the expanded product are shown in Table 2. It was an expanded product excellent in flexibility, heat resistance and surface appearance.

COMPARATIVE EXAMPLES 8–9

Following the procedures of Example 9 except that the proportions of the propylene-ethylene block copolymer, the ethylene-octene rubber and carbon dioxide were changed as shown in Table 2, expanded products were obtained.

Evaluation results of the expanded products are shown in Table 2. They were not preferred for a poor surface appearance, expansion ratios different from desired ones, and the like. They were not expanded products intended by the present invention.

COMPARATIVE EXAMPLE 10

Following the procedures of Example 9 except that azodicarbonamide was used as a blowing agent in place of carbon dioxide and the cylinder temperature was set at 200° C. to produce gas by decomposing the azodicarbonamide, an expanded product was obtained.

Evaluation results of the expanded product are shown in Table 2. The expanded product had non-uniform cell diameters and a poor surface appearance, and was not an expanded product intended by the present invention.

TABLE 2

|  | Example | | | | | | | Comparative Example | | |
| --- | --- | --- | --- | --- | --- | --- | --- | --- | --- | --- |
|  | 9 | 10 | 11 | 12 | 13 | 14 | 15 | 8 | 9 | 10 |
| Ethylene-octene rubber (parts by weight) | 36 | 50 | 70 | 100 | 30 | 30 | 30 | 30 | 30 | 30 |
| Olefin plastic (parts by weight) | 70 | 50 | 30 | — | 70 | 70 | 70 | 70 | 70 | 70 |
| Carbon dioxide (parts by weight) | 10 | 10 | 10 | 10 | 2 | 20 | 10 | 0.05 | 40 | — |
| Azodicarbonamide (parts by weight) | — | — | — | — | — | — | — | — | — | 2 |
| Surface appearance | A | A | A | A | A | A | A | A | C | B |
| Expansion ratio | 2 | 2 | 2 | 2 | 2 | 2 | 2 | 1.3 | 3 | 2 |
| Flexibility | B | A⁻ | A⁻ | A | B | B | B | B⁻ | B | B |
| Heat resistance | A | B | B | B | A | A | A | A | A | A |
| Average cell diameter ($\mu$m) | 200 | 200 | 200 | 200 | 200 | 200 | 200 | 200 | 500 | 300 |
| Cell uniformity | A | A | B | B | A | A | A | C | C | C |
| Stability of quality | A | A | B | B | A | A | A | A | C | C |

EXAMPLE 16

The apparatus illustrated in FIG. 7 was used. As a continuous plasticator, the tandem extruder provided with the first extruder 21 having a screw diameter of 50 mm and the second extruder 22 having a screw diameter of 65 mm was used. To the free end of the second extruder 22, the circular die 29 the outlet gap and diameter of which were 0.5 mm and 80 mm was connected, and as cooling means, the water-cooled mandrel 31 of 200 mm in diameter was employed.

A carbon dioxide adding section was arranged around the center of the first extruder 21.

Forty (40) parts by weight of the mineral-oil-base softening agent ("DYNA PROCESS OIL PW-380", trade name; product of Idemitsu Kosan Co., Ltd.) were mixed with 100 parts by weight of the ethylene-propylene-5-ethylidene-2-norbornene copolymer the ethylene content, iodine value and Mooney viscosity [$ML_{1+4}$ (100° C.)] of which were 78 mole %, 13 and 140, whereby oil-extended EPDM pellets were obtained. Sixty (60) parts by weight of the oil-extended EPDM pellets, 25 parts by weight of propylene-ethylene block copolymer pellets the ethylene content and melt flow rate (ASTM D-1238-65T, 230° C., 2.16 kg load) of which were 8 wt. % and 10 g/10 minutes and 15 parts by weight of ethylene-4-methyl-1-butene copolymer pellets, the ethylene content and melt flow rate (ASTM D-1238-65T, 190° C., 2.16 kg load) of which were 97 wt. % and 10 g/10 minutes were mixed as olefinic thermoplastic elastomers with a liquid mixture of 0.2 part by weight of 1,3-bis(tert-butylperoxyisopropyl)benzene and 0.2 part by weight of divinylbenzene in a tumbling blender, whereby the liquid mixture was caused to evenly adhere to surfaces of the mixed pellets. The pellets were extruded at 230° C. by using a twin-screw extruder ("TEM-50", trade name; manufactured by Toshiba Machine Co., Ltd.) to perform dynamic heat treatment, whereby a thermoplastic elastomer (A) the gel content of which had been adjusted to 95 wt. % was obtained. Ninety-five (95) parts by weight of the thermoplastic elastomer (A) and as an olefin plastic (B), 5 parts by weight of propylene-ethylene block copolymer pellets, the ethylene content and melt flow rate (ASTM D-1238-65T) of which were 6 wt. % and 0.60 g/10 minutes, were dry-blended to obtain an olefinic thermoplastic elastomer composition. The composition was charged through the hopper 26 into the first extruder 21, where the composition was heated and molten at 220° C.

The liquefied carbon dioxide cylinder 4 of the siphon type was used to permit supplying carbon dioxide directly from a liquid phase. Using the cooling medium circulator 6, the flow line from the liquefied carbon dioxide cylinder 4 to the plunger pump 5 was cooled with an aqueous ethylene glycol solution controlled at −12° C., thereby making it possible to charge carbon dioxide in a liquefied state into the plunger pump 5. The plunger pump 5 was then controlled such that the adding rate of the thus-charged liquefied carbon dioxide became 1 kg/hour, and the delivery pressure of the plunger pump 5 was adjusted to 30 MPa by the pressure control valve 7. At this time, the volumetric efficiency of the plunger pump 3 became constant at 65%. The line, which extended from the pressure control valve 7 to the carbon dioxide adding section of the first extruder 21, was then heated by the heater 8 such that its temperature remained at 50° C., and carbon dioxide was added to the molten olefinic thermoplastic elastomer in the first extruder 21. At that time, the pressure of the molten resin in the carbon dioxide adding section was 20 MPa. Namely, the carbon dioxide immediately before its dissolution in the molten olefinic thermoplastic elastomer was carbon dioxide in a supercritical state that its temperature was 50° C. or higher and its pressure was 20 MPa.

In the manner as described above, the supercritical carbon dioxide was added to the first extruder 21 in a proportion of 2 parts by weight per 100 parts by weight of the molten olefinic thermoplastic elastomer while measuring the supercritical carbon dioxide by the flowmeter 9, and they were mixed by the screw 27 into an intimate mixture. The molten olefinic thermoplastic elastomer was then fed to the second extruder 22, where the elastomer was heated to a resin temperature of 188° C. and then extruded at a delivery rate of 10 kg/hour through the circular die 29. At that time, the pressure of the die was 8 MPa. The extruded olefinic thermoplastic elastomer underwent expansion concurrently with its coming out of the circular die 29, and was applied on the water-cooled mandrel 31 arranged after the die 29. After the resulting expanded polystyrene, which has been formed into a cylindrical shape, is caused to advance along the mandrel 31 while being cooled, it was cut open by a cutter blade to provide an expanded olefinic thermoplastic elastomer sheet 30. The thus-obtained expanded olefinic thermoplastic elastomer sheet 30 was 630 mm in width and 1.5 mm in thickness, and its external appearance was smooth and beautiful.

Evaluation results of the expanded sheet are shown in Table 3. It was an expanded product excellent in surface appearance, heat resistance and surface appearance.

EXAMPLES 17–21

Following the procedures of Example 16 except that the proportion of carbon dioxide and the resin temperature were changes to the proportions and temperatures shown in Table 3, expanded olefinic thermoplastic elastomer sheets 30 were obtained.

Evaluation results of the expanded sheets are shown in Table 3. They were expanded products excellent in flexibility, heat resistance and surface appearance.

EXAMPLE 22

Following the procedures of Example 16 except that as an olefin plastic (B), propylene homopolymer the melt flow rate (ASTM D-1238-65T, 230° C., 2.16 kg load) was 0.60 g/10 minutes was used in place of the propylene-ethylene block copolymer the ethylene content and melt flow rate (ASTM D-1238-65T) of which were 6 wt. % and 0.60 g/10 minutes, an expanded olefinic thermoplastic elastomer sheet 30 was obtained.

Evaluation results of the expanded sheet are shown in Table 3. It was an expanded product excellent in flexibility, heat resistance and surface appearance.

EXAMPLE 23

Following the procedures of Example 16 except that 60 parts by weight of oil-extended EPDM, which had been obtained by blending 40 parts by weight of the mineral-oil-base softening agent ("DYNA PROCESS OIL PW-380", trade name; product of Idemitsu Kosan Co., Ltd.) with 100 parts by weight of an ethylenepropylene-5-ethylidene-2-norbornene copolymer the ethylene content, iodine value and Mooney viscosity [$ML_{1+4}$ (100° C.)] of which were 73 mole %, 13 and 140, 15 parts by weight of butyl rubber the unsaturation degree and Mooney viscosity [$ML_{1+4}$ (100° C.)] of which were 0.7 mole % and 56 and 15 parts by weight of a propylene-ethylene random copolymer the ethylene content and melt flow rate (ASTM D-1238-65T, 230° C., 2.16 kg load) of which were 3.2 wt. % and 10 g/10 minutes were kneaded with 10 parts by weight of the mineral-oil-base softening agent ("DYNA PROCESS OIL PW-380", trade name; product of Idemitsu Kosan Co., Ltd.) at 180° C. for 5 minutes in a nitrogen gas atmosphere by a Banbury mixer, the kneaded melt was caused to pass through a sheeting roll, the thus-obtained sheet was then chopped into pellets, 100 parts by weight of the pellets so obtained were mixed with a liquid mixture of 0.4 part by weight of 1,3-bis(tert-butylperoxy-isopropyl)benzene and 0.5 parts by weight of divinyl benzene in a tumbling blender to cause the liquid mixture to evenly adhere to surfaces of the pellets, the pellets were extruded at 230° C. by a twin-screw extruder ("TEM-50", trade name; manufactured by Toshiba Machine Co., Ltd.) to perform dynamic heat treatment, and the thus-prepared crosslinked thermoplastic elastomer the gel content of which was 80 wt. % was used, an expanded olefinic thermoplastic elastomer sheet (30) was obtained.

Evaluation results of the expanded sheet are shown in Table 3. It was an expanded product excellent in flexibility, heat resistance and surface appearance.

COMPARATIVE EXAMPLE 11

Following the procedures of Example 16 except that the proportion of carbon dioxide was changed to the proportion shown in Table 3, an attempt was made to obtained an olefinic thermoplastic elastomer sheet. The results are shown in Table 3. Even when the resin was delivered through the die and its pressure was released, the resin underwent practically no expansion, thereby failing to produce an expanded sheet as intended by the present invention.

COMPARATIVE EXAMPLE 12

Following the procedures of Example 16 except that the proportion of carbon dioxide was changed to the proportion shown in Table 3, an attempt was made to obtained an olefinic thermoplastic elastomer sheet. The results are shown in Table 3. Upon delivery through the die and release of a pressure, the resin initiated expansion. Cells became greater and collapsed, so that the expansion ratio was lowered. It was hence unable to obtain an expanded sheet as intended by the present invention.

COMPARATIVE EXAMPLE 13

Following the procedures of Example 16 except that the olefin plastic (B) was added simultaneously with the thermoplastic elastomer (A).

Namely, 40 parts by weight of the mineral-oil-base softening agent ("DYNA PROCESS OIL PW-380", trade name; product of Idemitsu Kosan Co., Ltd.) were mixed with 100 parts by weight of the ethylene-propylene-5-ethylidene-2-norbornene copolymer the ethylene content, iodine value and Mooney viscosity [$ML_{1+4}$ (100° C.)] of which were 78 mole %, 13 and 140, whereby oil-extended EPDM pellets were obtained. Sixty (60) parts by weight of the oil-extended EPDM pellets, 25 parts by weight of propylene-ethylene block copolymer pellets the ethylene content and melt flow rate (ASTM D-1238-65T, 230° C., 2.16 kg load) of which were 8 wt. % and 10 g/10 minutes, 15 parts by weight of ethylene-4-methyl-1-butene copolymer pellets the ethylene content and melt flow rate (ASTM D-1238-65T, 190° C., 2.16 kg load) of which were 97 wt. % and 10 g/10 minutes, 5 parts by weight of propylene-ethylene block copolymer pellets the ethylene content and melt flow rate (ASTM D-1238-65T, 230° C., 2.16 kg load) of which were 6 wt. % and 0.60 g/10 minutes, and a liquid mixture of 0.2 part by weight of 1,3-bis(tert-butylperoxyisopropyl)benzene and 0.2 part by weight of divinylbenzene were mixed in a tumbling blender, whereby the liquid mixture was caused to evenly adhere to surfaces of the mixed pellets. The pellets were extruded at 230° C. by using a twin-screw extruder ("TEM-50", trade name; manufactured by Toshiba Machine Co., Ltd.) to perform dynamic heat treatment, whereby an olefinic thermoplastic elastomer composition was obtained.

Following the procedures of Example 16 except that the olefinic thermoplastic elastomer composition produced by the above-described procedures was used, an expanded olefinic thermoplastic elastomer sheet was obtained. Evaluation results of the expanded sheet are shown in Table 3.

The external appearance of the sheet was poor due to the development of cell collapse, and its expansion ratio was different from that of the expanded sheet produced in Example 16.

It was also accompanied by further defects such as uneven cell diameters. It was therefore unable to produce an expanded sheet as intended by the present invention.

COMPARATIVE EXAMPLE 14

Following the procedures of Example 16 except that azodicarbonamide was used as a blowing agent in place of carbon dioxide and the cylinder temperature was set at 200° C. to produce gas by decomposing the azodicarbonamide, an expanded product was obtained.

Evaluation results of the expanded product are shown in Table 3. The expanded product had non-uniform cell diameters and a poor surface appearance, and was not an expanded product intended by the present invention.

COMPARATIVE EXAMPLE 15

Following the procedures of Example 23 except that azodicarbonamide was used as a blowing agent in place of carbon dioxide and the cylinder temperature was set at 200° C. to produce gas by decomposing the azodicarbonamide, an expanded product was obtained.

Evaluation results of the expanded product are shown in Table 3. The expanded product had non-uniform cell diameters and a poor surface appearance, and was not an expanded product intended by the present invention.

COMPARATIVE EXAMPLE 16

Following the procedures of Example 16 except that the ethylene-vinyl acetate copolymer, the melt flow rate (ASTM D-1238-65T, 190° C., 2.16 kg load) and vinyl acetate content of which were 30 g/10 minutes and 33 wt. %, was used in place of the olefinic thermoplastic elastomer and butane gas was used as a blowing agent, an expanded product was obtained.

Evaluation results of the expanded product are shown in Table 3. The expanded product was good in flexibility but poor in heat resistance. It was therefore not an expanded product intended by the present invention.

COMPARATIVE EXAMPLE 17

Following the procedures of Example 16 except that a propylene-ethylene block copolymer, an olefinic plastic (B), was used in place of the olefinic thermoplastic elastomer and butane gas was used as a blowing agent, an expanded product was obtained.

Evaluation results of the expanded product are shown in Table 3. The expanded product was good in heat resistance but poor in flexibility. It was therefore not an expanded product intended by the present invention.

According to the present invention, a predetermined amount of carbon dioxide can be added stably at a constant rate to a molten olefinic thermoplastic elastomer, thereby making it possible to produce with uniform quality expanded olefinic thermoplastic elastomer products ranging from high-density expanded products to low-density expanded products. Moreover, owing to the use of carbon dioxide as a substitute for conventional Freon or butane, the present invention is free of air pollution and destruction of the ozonosphere and is also excellent in safety.

We claim:

1. A process for producing an expanded product with carbon dioxide as a blowing agent, which comprises:

as a gas-dissolving step, adding carbon dioxide to a molten olefinic thermoplastic elastomer (A) selected from the below-described elastomers (A-1) to (A-3) in a proportion of 0.1 to 30 parts by weight of said carbon dioxide per 100 parts by weight of said molten olefinic thermoplastic elastomer (A), and forming a molten olefinic thermoplastic elastomer composition in which said olefinic thermoplastic elastomer and said carbon dioxide are in a mutually-dissolved state; and as a cooling step, lowering said molten olefinic thermoplastic elastomer composition in temperature which is from 50 to 250° C. and is equal to or higher than a plasticizing temperature of said molten olefinic thermoplastic elastomer composition, but is lower than the temperature of said molten olefinic thermoplastic elastomer composition in said gas dissolving step (A-1) an ethylene-α-olefin copolymer composed of ethylene and an α-olefin having 3 to 20 carbon atoms;

(A-2) an ethylene-α-olefin-non-conjugated diene copolymer composed of ethylene, an α-olefin having 3 to 20 carbon atoms and a non-conjugated diene; and (A-3) a crosslinked product obtained by dynamically heat-treating in the presence of a crosslinking agent a mixture composed of (a) 60 to 95 parts by weight of a crosslinking olefin copolymer, which is an ethylene-α-olefin copolymer composed of ethylene and an αolefin having 3 to 20 carbon atoms or which is an ethylene-α-olefin-non-conjugated diene copolymer composed of ethylene, an α-olefin having 3 to 20 carbon atoms and a non-conjugated diene, and (b) 5 to 40 parts by weight of a decomposable olefin plastic, which is a homopolymer or copolymer in which a content of an α-olefin having 3 to 20 carbon atoms is from 50 to 100 mole % and which has a melt flow rate of from 0.5 to 80 g/10 minutes as measured in accordance with ASTM D-1238-65T, with a proviso that a sum of said component (a) and said component (b) is 100 parts by weight.

TABLE 3

| | Example | | | | | | | | Comparative Example | | | | | | |
|---|---|---|---|---|---|---|---|---|---|---|---|---|---|---|---|
| | 16 | 17 | 18 | 19 | 20 | 21 | 22 | 23 | 11 | 12 | 13 | 14 | 15 | 16 | 17 |
| Thermoplastic elastomer (parts by weight) | 95 | 80 | 60 | 95 | 80 | 60 | 95 | 95 | 95 | 95 | 100 | — | 95 | — | — |
| Olefin plastic (parts by weight) | 5 | 20 | 40 | 5 | 20 | 40 | 5 | 5 | 5 | 5 | — | 100 | 5 | — | 100 |
| Ethylene-vinyl acetate copolymer (parts by weight) | — | — | — | — | — | — | — | — | — | — | — | — | — | 100 | — |
| Carbon dioxide (parts by weight) | 2 | 2 | 2 | 5 | 5 | 5 | 2 | 2 | 0.05 | 35 | 2 | — | — | — | — |
| Azodicarbonamide (parts by weight) | — | — | — | — | — | — | — | — | — | — | — | — | 2 | — | — |
| Butane gas (parts by weight) | — | — | — | — | — | — | — | — | — | — | — | 2 | — | 2 | 2 |
| Expansion nucleating agent (parts by weight) | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Surface appearance | A | A | A | A | A | A | A | A | A | C | C | A | B | A | A |
| Expansion ratio | 2.2 | 2.6 | 3.4 | 4.8 | 5.7 | 7.2 | 2.0 | 2.2 | 1.1 | 1.3 | 1.2 | 4.8 | 2.0 | 4.8 | 4.8 |
| Flexibility | A⁻ | A⁻ | A⁻ | A | A | A | A⁻ | A⁻ | | | | B⁻ | B | A | B⁻ |
| Heat resistance | A | A | A | B | B | B | A | A | | | | A | A | C | A |
| Average cell diameter (μm) | 100 | 100 | 110 | 120 | 120 | 130 | 110 | 130 | 70 | 500 | 300 | 300 | 200 | 300 | 300 |
| Cell uniformity | A | A | A | A | A | A | A | A | B | C | B | A | C | B | A |
| Stability of quality | A | A | A | A | A | A | A | A | B | C | C | A | C | B | A |

2. The process according to claim 1, wherein as said olefinic thermoplastic elastomer, a composition composed of 100 parts by weight of said thermoplastic elastomer (A) selected from said elastomers (A-1) to (A-3) and 5 to 100 parts by weight of an olefin plastic (B), which is a homopolymer or copolymer in which a content of an α-olefin having 2 to 20 carbon atoms is from 50 to 100 mole % and which has a melt flow rate of from 0.01 to 2 g/10 minutes as measured in accordance with ASTM D-1238-65T, is used.

3. The process according to claim 1, wherein in said gas-dissolving step, carbon dioxide is added in a proportion of from 0.1 to 20 parts by weight.

4. The process according to claim 2, wherein in said gas-dissolving step, carbon dioxide is added in a proportion of from 0.1 to 20 parts by weight.

5. The process according to claim 1, which is a process for producing an expanded olefinic thermoplastic elastomer by injection molding and comprises:
   (i) as a gas-dissolving step, melting 100 parts by weight of an olefinic thermoplastic elastomer at 100 to 300° C. in a resin-plasticating cylinder equipped with a feed line through which a blowing agent is added to said molten thermoplastic resin, adding carbon dioxide in a proportion of from 0.1 to 30 parts by weight per 100 parts by weight of said olefinic thermoplastic elastomer, and forming a molten olefinic thermoplastic elastomer composition in which said olefinic thermoplastic elastomer and said carbon dioxide are in a mutually-dissolved state;
   (ii) as a cooling step, cooling said molten olefinic thermoplastic elastomer composition to said temperature, which is from 50 to 250° C. and is equal to or higher than a plasticizing temperature of said molten olefinic thermoplastic elastomer composition, in said resin-plasticating cylinder;
   (iii) as a metering and injection step, metering the thus-cooled molten olefinic thermoplastic elastomer composition and injecting the same into a mold; and
   (iv) as an expansion control step, inducing formation of cell nuclei to control an expansion ratio by lowering a pressure in said mold.

6. The process according to claim 2, which is a process for producing an expanded olefinic thermoplastic elastomer by injection molding and comprises:
   (i) as a gas-dissolving step, melting 100 parts by weight of an olefinic thermoplastic elastomer at 100 to 300° C. in a resin-plasticating cylinder equipped with a feed line through which a blowing agent is added to said molten thermoplastic resin, adding carbon dioxide in a proportion of from 0.1 to 30 parts by weight per 100 parts by weight of said olefinic thermoplastic elastomer, and forming a molten olefinic thermoplastic elastomer composition in which said olefinic thermoplastic elastomer and said carbon dioxide are in a mutually-dissolved state;
   (ii) as a cooling step, cooling said molten olefinic thermoplastic elastomer composition to said temperature, which is from 50 to 250° C. and is equal to or higher than a plasticizing temperature of said molten olefinic thermoplastic elastomer composition, in said resin-plasticating cylinder;
   (iii) as a metering and injection step, metering the thus-cooled molten olefinic thermoplastic elastomer composition and injecting the same into a mold; and
   (iv) as an expansion control step, inducing formation of cell nuclei to control an expansion ratio by lowering a pressure in said mold.

7. The process according to claim 1, which comprises:
   (i) as a gas dissolving step, melting an olefinic thermoplastic elastomer at a temperature equal to or higher than a plasticizing temperature of said olefinic thermoplastic elastomer in a continuous plasticator equipped with a feed line through which a blowing agent is added to the molten olefinic thermoplastic elastomer, adding carbon dioxide in a proportion of from 0.1 to 20 parts by weight per 100 parts by weight of said olefinic thermoplastic elastomer, and forming a molten olefinic thermoplastic elastomer composition in which said olefinic thermoplastic elastomer and said carbon dioxide are in a mutually-dissolved state;
   (ii) as a cooling step, cooling said molten olefinic thermoplastic elastomer composition to said temperature, which is equal to or higher than a plasticizing temperature of said molten olefinic thermoplastic elastomer composition, is higher by 50° C. or less than said plasticizing temperature of said molten olefinic thermoplastic elastomer composition and is lower than said melting temperature in said gas dissolving step, at a tip portion of said continuous plasticator;
   (iii) as a cell nuclei forming step, extruding said molten olefinic thermoplastic elastomer composition through a die connected to said tip portion of said continuous plasticator and set to an optimal expansion temperature of said molten olefinic thermoplastic elastomer composition, whereby a pressure of said molten olefinic thermoplastic elastomer composition is lowered to a pressure equal to or lower than a critical pressure of carbon dioxide to induce formation of cell nuclei; and
   (iv) as an expansion control step, rapidly cooling the thus-extruded expanded thermoplastic resin product to a temperature equal to or lower than a crystallization temperature of said olefinic thermoplastic elastomer.

8. The process according to claim 2, which comprises:
   (i) as a gas dissolving step, melting an olefinic thermoplastic elastomer at a temperature equal to or higher than a plasticizing temperature of said olefinic thermoplastic elastomer in a continuous plasticator equipped with a feed line through which a blowing agent is added to the molten olefinic thermoplastic elastomer, adding carbon dioxide in a proportion of from 0.1 to 20 parts by weight per 100 parts by weight of said olefinic thermoplastic elastomer, and forming a molten olefinic thermoplastic elastomer composition in which said olefinic thermoplastic elastomer and said carbon dioxide are in a mutually-dissolved state;
   (ii) as a cooling step, cooling said molten olefinic thermoplastic elastomer composition to said temperature, which is equal to or higher than a plasticizing temperature of said molten olefinic thermoplastic elastomer composition, is higher by 50° C. or less than said plasticizing temperature of said molten olefinic thermoplastic elastomer composition and is lower than said melting temperature in said gas dissolving step, at a tip portion of said continuous plasticator;
   (iii) as a cell nuclei forming step, extruding said molten olefinic thermoplastic elastomer composition through a die connected to said tip portion of said continuous plasticator and set to an optimal expansion temperature of said molten olefinic thermoplastic elastomer composition, whereby a pressure of said molten olefinic thermoplastic elastomer composition is lowered to a pressure equal to or lower than a critical pressure of carbon dioxide to induce formation of cell nuclei; and (iv) as an expansion control step, rapidly cooling the thus-extruded expanded thermoplastic resin product to a temperature equal to or lower than a crystallization temperature of said olefinic thermoplastic elastomer.

9. The process according to claim 3, which comprises:
(i) as a gas dissolving step, melting an olefinic thermoplastic elastomer at a temperature equal to or higher than a plasticizing temperature of said olefinic thermoplastic elastomer in a continuous plasticator equipped with a feed line through which a blowing agent is added to the molten olefinic thermoplastic elastomer, adding carbon dioxide in a proportion of from 0.1 to 20 parts by weight per 100 parts by weight of said olefinic thermoplastic elastomer, and forming a molten olefinic thermoplastic elastomer composition in which said olefinic thermoplastic elastomer and said carbon dioxide are in a mutually-dissolved state;
(ii) as a cooling step, cooling said molten olefinic thermoplastic elastomer composition to said temperature, which is equal to or higher than a plasticizing temperature of said molten olefinic thermoplastic elastomer composition, is higher by 50° C. or less than said plasticizing temperature of said molten olefinic thermoplastic elastomer composition and is lower than said melting temperature in said gas dissolving step, at a tip portion of said continuous plasticator;
(iii) as a cell nuclei forming step, extruding said molten olefinic thermoplastic elastomer composition through a die connected to said tip portion of said continuous plasticator and set to an optimal expansion temperature of said molten olefinic thermoplastic elastomer composition, whereby a pressure of said molten olefinic thermoplastic elastomer composition is lowered to a pressure equal to or lower than a critical pressure of carbon dioxide to induce formation of cell nuclei; and
(iv) as an expansion control step, rapidly cooling the thus-extruded expanded thermoplastic resin product to a temperature equal to or lower than a crystallization temperature of said olefinic thermoplastic elastomer.

10. The process according to claim 1, wherein upon adding carbon dioxide in said gas-dissolving step, said carbon dioxide is added to said molten olefinic thermoplastic elastomer after charging said carbon dioxide into a predetermined amount deliverable pump while allowing said carbon dioxide to remain in a liquefied state, delivering the thus-charged carbon dioxide with a delivery pressure of said predetermined amount deliverable pump controlled by a pressure control valve such that said delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert said carbon dioxide into supercritical carbon dioxide.

11. The process according to claim 2, wherein upon adding carbon dioxide in said gas-dissolving step, said carbon dioxide is added to said molten olefinic thermoplastic elastomer after charging said carbon dioxide into a predetermined amount deliverable pump while allowing said carbon dioxide to remain in a liquefied state, delivering the thus-charged carbon dioxide with a delivery pressure of said predetermined amount deliverable pump controlled by a pressure control valve such that said delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert said carbon dioxide into supercritical carbon dioxide.

12. The process according to claim 3, wherein upon adding carbon dioxide in said gas-dissolving step, said carbon dioxide is added to said molten olefinic thermoplastic elastomer after charging said carbon dioxide into a predetermined amount deliverable pump while allowing said carbon dioxide to remain in a liquefied state, delivering the thus-charged carbon dioxide with a delivery pressure of said predetermined amount deliverable pump controlled by a pressure control valve such that said delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert said carbon dioxide into supercritical carbon dioxide.

13. The process according to claim 4, wherein upon adding carbon dioxide in said gas-dissolving step, said carbon dioxide is added to said molten olefinic thermoplastic elastomer after charging said carbon dioxide into a predetermined amount deliverable pump while allowing said carbon dioxide to remain in a liquefied state, delivering the thus-charged carbon dioxide with a delivery pressure of said predetermined amount deliverable pump controlled by a pressure control valve such that said delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert said carbon dioxide into supercritical carbon dioxide.

14. The process according to claim 5, wherein upon adding carbon dioxide in said gas-dissolving step, said carbon dioxide is added to said molten olefinic thermoplastic elastomer after charging said carbon dioxide into a predetermined amount deliverable pump while allowing said carbon dioxide to remain in a liquefied state, delivering the thus-charged carbon dioxide with a delivery pressure of said predetermined amount deliverable pump controlled by a pressure control valve such that said delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert said carbon dioxide into supercritical carbon dioxide.

15. The process according to claim 6, wherein upon adding carbon dioxide in said gas-dissolving step, said carbon dioxide is added to said molten olefinic thermoplastic elastomer after charging said carbon dioxide into a predetermined amount deliverable pump while allowing said carbon dioxide to remain in a liquefied state, delivering the thus-charged carbon dioxide with a delivery pressure of said predetermined amount deliverable pump controlled by a pressure control valve such that said delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert said carbon dioxide into supercritical carbon dioxide.

16. The process according to claim 7, wherein upon adding carbon dioxide in said gas-dissolving step, said carbon dioxide is added to said molten olefinic thermoplastic elastomer after charging said carbon dioxide into a predetermined amount deliverable pump while allowing said carbon dioxide to remain in a liquefied state, delivering the thus-charged carbon dioxide with a delivery pressure of said predetermined amount deliverable pump controlled by a pressure control valve such that said delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert said carbon dioxide into supercritical carbon dioxide.

17. The process according to claim 8, wherein upon adding carbon dioxide in said gas-dissolving step, said carbon dioxide is added to said molten olefinic thermoplastic elastomer after charging said carbon dioxide into a predetermined amount deliverable pump while allowing said carbon dioxide to remain in a liquefied state, delivering the thus-charged carbon dioxide with a delivery pressure of said predetermined amount deliverable pump controlled by a pressure control valve such that said delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert said carbon dioxide into supercritical carbon dioxide.

18. The process according to claim 9, wherein upon adding carbon dioxide in said gas-dissolving step, said carbon dioxide is added to said molten olefinic thermoplastic elastomer after charging said carbon dioxide into a predetermined amount deliverable pump while allowing said carbon dioxide to remain in a liquefied state, delivering the thus-charged carbon dioxide with a delivery pressure of said predetermined amount deliverable pump controlled by a pressure control valve such that said delivery pressure remains constant within a range of from a critical pressure (7.4 MPa) of carbon dioxide to 40 MPa, and then heating the thus-delivered carbon dioxide to a critical temperature (31° C.) of carbon dioxide or higher to convert said carbon dioxide into supercritical carbon dioxide.

* * * * *

UNITED STATES PATENT AND TRADEMARK OFFICE
CERTIFICATE OF CORRECTION

PATENT NO. : 6,303,666 B1
DATED : October 16, 2001
INVENTOR(S) : Kaoru Yorita et al.

It is certified that error appears in the above-identified patent and that said Letters Patent is hereby corrected as shown below:

Title page,
Item [56], References Cited, U.S. PATENT DOCUMENTS, add
-- 5,475,035      12/1995           Garcia et al. --
add FOREIGN PATENT DOCUMENTS, and list
-- 0 291 764 A   11/1988         (EP)
   0 281 336 A   9/1988          (EP) --

Signed and Sealed this

Tenth Day of September, 2002

*Attest:*

*Attesting Officer*

JAMES E. ROGAN
*Director of the United States Patent and Trademark Office*